United States Patent
King et al.

(10) Patent No.: US 12,516,807 B2
(45) Date of Patent: Jan. 6, 2026

(54) HYDROGEN-OXYGEN BUBBLE STEAM BOILER

(71) Applicant: Robert Warren King, Newport Beach, CA (US)

(72) Inventors: Robert Warren King, Newport Beach, CA (US); Phineas Jonathan Marshall, Santa Ana, CA (US)

(73) Assignee: Robert Warren King, Newport Beach, CA (US)

( * ) Notice: Subject to any disclaimer, the term of this patent is extended or adjusted under 35 U.S.C. 154(b) by 0 days.

(21) Appl. No.: 18/972,681

(22) Filed: Dec. 6, 2024

(65) Prior Publication Data

US 2025/0189119 A1 Jun. 12, 2025

Related U.S. Application Data

(60) Provisional application No. 63/608,118, filed on Dec. 8, 2023.

(51) Int. Cl.
*F22B 7/16* (2006.01)
*F01K 25/00* (2006.01)
(Continued)

(52) U.S. Cl.
CPC ............. *F22B 7/16* (2013.01); *F01K 25/005* (2013.01); *F22B 1/003* (2013.01); *F22B 35/00* (2013.01);
(Continued)

(58) Field of Classification Search
CPC ........ F24H 9/1832; F24H 1/0054; F24H 1/20; F22B 7/16; F22B 1/003; F22B 35/00; F01K 25/005
See application file for complete search history.

(56) References Cited

U.S. PATENT DOCUMENTS 1,483,917 A * 2/1924 Tucker .................... F22B 1/003
122/4 R
4,644,905 A * 2/1987 Vierling .................. F22B 1/265
122/5.52
(Continued)

FOREIGN PATENT DOCUMENTS

WO WO 2014/153427 9/2014
WO WO-2024161731 A1 * 8/2024

OTHER PUBLICATIONS

WO_2024161731_A1 translation (Year: 2024).*
(Continued)

*Primary Examiner* — Michael G Hoang
*Assistant Examiner* — Kurt J Wolford
(74) *Attorney, Agent, or Firm* — Knobbe, Martens, Olson & Bear, LLP

(57) ABSTRACT

A system for boiling a fluid to produce a vapor through the reaction of one or more reactive gases within the fluid is generally disclosed. The system may include a gas meter to provide specific quantities of the one or more gases to a reaction zone. The system can include electrodes that are constantly operating. Once the one or more gases pass between the electrodes from the gas meter, the electrodes automatically ignite the gas or gases without requiring control systems to trigger the electrodes' operation. The vapor and/or resultant thermal energy generated by the system can be used to provide heat, steam, warmed water, and/or other reactants for use. The vapor generated by the system can be used for power generation to turn a turbine, to provide heat via a radiator, or for various other uses.

17 Claims, 7 Drawing Sheets

(51) Int. Cl.
*F22B 1/00* (2006.01)
*F22B 35/00* (2006.01)
*F24H 9/1832* (2022.01)
*F24H 1/00* (2022.01)
*F24H 1/20* (2022.01)

(52) U.S. Cl.
CPC ......... *F24H 9/1832* (2022.01); *F24H 1/0054* (2013.01); *F24H 1/20* (2013.01)

(56) References Cited

U.S. PATENT DOCUMENTS

| | | |
|---|---|---|
| 11,796,173 B2 | 10/2023 | Stockton |
| 11,885,490 B2 * | 1/2024 | Stockton ................. F23D 14/70 |
| 2007/0224563 A1 | 9/2007 | Glasgow et al. |

OTHER PUBLICATIONS

CorroProtec_Water_heater_pressure_relief_valves_what_you_need_to_know_2021.pdf (Year: 2021).*
Extended European Search Report for European Application No. EP 24218261.6 dated Apr. 24, 2025.

* cited by examiner

HYDROGEN-OXYGEN BUBBLE STEAM BOILER

CROSS REFERENCE TO RELATED APPLICATIONS

This application claims the priority benefit of U.S. Provisional Patent Application No. 63/608,118, filed Dec. 8, 2023, the contents of which are incorporated by reference herein in their entirety.

BACKGROUND

The application relates to boilers and other power generation systems using heated fluids to generate a gaseous form or vapor such as steam to drive a turbine, and similar devices and systems.

SUMMARY

Traditional steam boilers are inefficient and not convenient due to the warmup time required to produce usable steam pressure.

Advantageously, as disclosed herein, a unique type of fluid boiler is disclosed. In multiple embodiments disclosed herein, the boiler is described as a steam boiler designed to ignite a mixture of hydrogen and oxygen within water to generate steam, however various gases can be utilized where a reaction under a fluid can generate a vapor. For simplicity, the application will generally refer to a hydrogen-water reaction within water to generate steam, however this should be understood as only one possible interpretation of the system and is in no way meant to be limiting as to the possible reactions performed. Fuel for the reaction may be obtained by electrolysis using green energy from photovoltaic, wind or other sources. In some embodiments, a gaseous fuel is fed into a set of pistons configured to rotate with a rotating wheel. The wheel can be rotated by the use of steam generated by the system, or by other systems known by one in the art. The steam produced by this system may be used to power a turbine to generate electrical energy, to transport thermal energy to heat a radiator, or for various other applications of steam use, both for personal use or for industrial equipment such as large machinery or automotives.

In one embodiment, on each side of the rotating wheel are a plurality of pistons spaced evenly and radially. These pistons may form a temporary gas tight seal with the rotating wheel such that they can receive a precise amount of gas being fed into the steam boiler system at an input. The gases being input can individually be inert or relatively inert when separate and can be reactive or relatively reactive when mixed. The pistons can feed the gas as bubbles into a mixer orifice that disperses the bubbles of the mixed gases into a water bath where a reaction can take place. In some embodiments, the gases can be oxygen gas and hydrogen gas. If oxygen and hydrogen are used as the fuel mixture, there are no toxic emissions from this process, only vented water vapor. If a hydrocarbon and oxygen fuel is used, the boiler can produce steam with a byproduct of $CO_2$. If, however, air is mixed with a gaseous hydrocarbon rather than oxygen, the system may produce oxidized nitrates which are harmful to the environment.

This device makes the production of steam convenient, efficient, and economical as both the heat and pressure from the ignition of the gas are conserved within an insulated boiler vessel.

As the bubbles exit the mixer orifice and rise, they can pass between a pair of electrodes that operate at a high voltage DC. The electrical domed grid can be charged such that it would substantially not react with water itself but would react when a bubble with a lower resistance passed between the electrodes. The passing of the bubble lowers the resistance between the electrodes and a spark is produced which ignites the fuel mixture.

The resultant ignition from the reactant gas mixture can produce energy in the form of water vapor (steam) and heat. The resultant ignition can also produce additional byproducts if fuels other than hydrogen and oxygen are used. The resultant steam produced can be captured in an upper portion of the boiler and the heat produced can be captured in the surrounding water. Advantageously, the surrounding water heated by the ignition can more efficiently be made into steam in subsequent reaction cycles. In some embodiments, if the pressure exceeds a predetermined safe pressure, a pressure sensitive safety plunger can trigger and shut off the gas at the input. In some embodiments, if the pressure exceeds a predetermined safe pressure, the steam can exit the boiler at a steam tube such that the pressure within the boiler equalizes with the pressure outside the boiler.

In some embodiments, the boiler can be configured such that pressure is relatively maintained between operations of the boiler. In some embodiments, the boiler can be configured to not have excess gas vented between uses, but always to maintain a steady vapor pressure so that steam power is always available. In some embodiments, an auxiliary tank can store pressure generated by steam to use in restarting the boiler after it is idled for maintenance, etc. Advantageously, systems can be modified to include several safety features that naturally also regulate pressure of the boiler system. In embodiments described herein, a pressure sensitive mechanism can close the inputs to the system once the pressure within the system meets or exceeds a predetermined safe level.

Advantageously, embodiments following this disclosure can make the production of steam convenient, efficient, and economical as both the heat and pressure from the ignition of the gas are conserved. Advantageously, the use of hydrogen and oxygen as the fuel sources hear can eliminate or significantly limit toxic emissions from this boiler. In some embodiments, the steam produced may be used for driving a turbine or piston in an automobile, train, generator, or other industrial equipment. Advantageously, the use of an auxiliary pressure tank can decrease the time required to begin a reaction with sufficient strength to generate power from the steam generator.

In some aspects, the techniques described herein relate to a system configured to generate vapor on reaction of one or more gases, the system including: a boiler vessel at least partially filled with fluid to a fluid level, the boiler vessel further including a produced vapor; a first gas input connected to the boiler vessel configured to provide a first gas to the system; a gas meter to receive the first gas; a reaction zone including a pair of electrodes, the pair of electrodes below the fluid level; and wherein the gas meter intermittently provides a metered amount of a reactant gas from the first gas to the reaction zone within the boiler vessel; wherein the reactant gas has lower electrical resistance than fluid in the boiler vessel; wherein the pair of electrodes are electrically charged such that, when the reactant gas passes between the pair of electrodes, the pair of electrodes automatically arc to ignite the reactant gas due to lower electrical resistance of the reactant gas; and wherein ignition of the metered amount of the reactant gas generates thermal energy to boil at least a portion of the fluid to form the produced vapor.

In some aspects, the techniques described herein relate to a system, further including a second gas input connected to the boiler vessel configured to provide a second gas to the system; wherein the gas meter receives a metered amount of the second gas; and wherein the reactant gas includes a mixture of the first gas and the second gas.

In some aspects, the techniques described herein relate to a system, wherein the first gas includes oxygen and the second gas includes hydrogen.

In some aspects, the techniques described herein relate to a system, further including a mixer dispersion nozzle configured to mix the first gas and the second gas of the metered amount of reactant gas; wherein the mixer dispersion nozzle includes a plurality of internal layers with one or more mixing apertures, wherein the metered amount of the first gas and the second gas mix as they pass through the one or more mixing apertures; wherein the reactant gas exits the mixer dispersion nozzle by an exit aperture to the reaction zone.

In some aspects, the techniques described herein relate to a system, wherein the gas meter includes a rotor system, wherein the rotor system includes a first rotor including: at least one piston arranged within a housing configured to rotate around a cam, each piston including a head and a connecting rod; and wherein, as the rotor rotates around the cam, the connecting rod moves from a cam fall to a cam rise to expel the first gas located in an area between the head and the housing.

In some aspects, the techniques described herein relate to a system, wherein the gas meter includes a rotor system, wherein the rotor system includes a first rotor and a second rotor; wherein each rotor includes: at least one piston arranged within a housing configured to rotate around a cam, each piston including a head and a connecting rod; and wherein, as the rotor rotates around the cam, the connecting rod moves from a cam fall to a cam rise to expel a gas located in an area between the head and the housing; wherein the first rotor expels the first gas and the second rotor expels the second gas.

In some aspects, the techniques described herein relate to a system, wherein the pair of electrodes includes a domed electrical grid surrounding the reaction zone, the domed electrical grid including a first electrode and a second electrode, wherein each of the first electrode and the second electrode include a plurality of curved parallel bars arranged in a dome shape; wherein, when the reactant gas passes between the first electrode and the second electrode, the electrodes arc to ignite the reactant gas.

In some aspects, the techniques described herein relate to a system, wherein the reaction zone includes an igniter tube; wherein the pair of electrodes includes a first electrode and a second electrode arranged in the igniter tube; wherein each of the electrodes are angled relative to the igniter tube, wherein the reactant gas displaces fluid within the igniter tube as the reactant gas passes through the igniter tube; wherein, when the electrodes are within the reactant gas, the electrodes arc and ignite the reactant gas.

In some aspects, the techniques described herein relate to a system, wherein the electrodes are angled at 45 degrees relative to the igniter tube.

In some aspects, the techniques described herein relate to a system further including a vapor output, wherein the produced vapor exits the boiler vessel by the vapor output.

In some aspects, the techniques described herein relate to a system, wherein the vapor output is configured to release vapor from the system if pressure within the system exceeds a predetermined safe pressure.

In some aspects, the techniques described herein relate to a system, further including a pressure maintenance valve within the boiler vessel, the pressure maintenance valve including: a piston arranged within a piston housing, the piston having a head and a connecting rod, the connecting rod including a bore aligned with the first gas input; and a spring arranged within the piston housing to bias the piston to a first position when pressure in the boiler vessel is below a critical pressure; wherein the piston moves to a second position when pressure in the boiler vessel is above the critical pressure; wherein, when in the first position, the first gas passes through the bore in the connecting rod to the gas meter; wherein, when in the second position, the bore is misaligned from the first gas input such that the first gas does not pass through the bore in the connecting rod.

In some aspects, the techniques described herein relate to a system further including an auxiliary pressure tank; wherein the auxiliary pressure tank includes at least a portion of the produced vapor; wherein the auxiliary pressure tank provides vapor to the rotor system; wherein the vapor provided to the rotor system drives rotation of the rotor system.

In some aspects, the techniques described herein relate to a system, wherein the gas meter includes a first gas input valving and a second gas input valving controlled by a gas controller; wherein, when a pressure sensor positioned to be in fluid communication with the boiler vessel indicates that pressure within the boiler vessel is below operational pressure, the gas controller provides the first gas and the second gas to the reaction zone by the first gas input valving and the second gas input valving; and wherein, when the pressure sensor indicates that pressure within the boiler vessel exceeds operational pressure, the gas controller does not provide the first gas or the second gas to the reaction zone.

In some aspects, the techniques described herein relate to a system, further including a valve accessible from outside the boiler vessel, wherein operation of the valve interrupts vapor flow through a rotor vapor input to stop rotation of the rotor system.

In some aspects, the techniques described herein relate to a system, further including a controller, a low limit switch positioned at a first position in the boiler vessel, and a high limit switch positioned at a second position in the boiler vessel; wherein, when the low limit switch is at least partially exposed to vapor, the controller allows fluid to fill the boiler vessel; and wherein, when the high limit switch is at least partially exposed to fluid, the controller prevents fluid from further filling the boiler vessel.

In some aspects, the techniques described herein relate to a system, wherein the fluid includes water and the vapor includes steam.

In some aspects, the techniques described herein relate to a system configured to produce steam on reaction of oxygen and hydrogen, the system including: a boiler vessel at least partially filled with water to a water level; an oxygen input including oxygen gas; a hydrogen input including hydrogen gas; a gas meter to receive the oxygen and the hydrogen, the gas meter including a rotor configured to intermittently provide a metered amount of a reactant gas, the reactant gas including a mixture of the oxygen and the hydrogen; and a reaction zone including a domed electrical grid, the domed electrical grid including a first electrode and a second electrode; wherein the gas meter provides the metered amount of the reactant gas to the reaction zone; wherein, when the reactant gas passes between the first electrode and the second electrode, the electrodes automatically arc and ignite the reactant gas due to lower electrical resistance of the reactant gas; wherein ignition of the metered amount of the reactant gas generates thermal energy to boil at least a portion of the water to produce steam; and wherein at least a portion of the produced steam drives rotation of the rotor.

In some aspects, the techniques described herein relate to a system, further including a pressure maintenance valve within the boiler vessel, the pressure maintenance valve including: a piston arranged within a piston housing, the piston having a head and a connecting rod, the connecting rod including a bore aligned with at least one of the oxygen input or the hydrogen input; and a spring arranged within the piston housing to bias the piston to a first position when pressure in the boiler vessel is below a critical pressure; wherein water within the boiler vessel moves the piston to a second position when pressure in the boiler vessel is above the critical pressure; wherein, when in the first position, at least one of the oxygen or the hydrogen passes through the bore in the connecting rod to the gas meter; wherein, when in the second position, the bore is misaligned with at least one of the oxygen input or the hydrogen input such that at least one of the oxygen or the hydrogen do not pass through the bore in the connecting rod.

In some aspects, the techniques described herein relate to a system configured to produce steam on reaction of oxygen and hydrogen, the system including: a boiler vessel at least partially filled with water to a water level; an oxygen input including oxygen gas; a hydrogen input including hydrogen gas; a gas meter in fluid communication with the oxygen input and the hydrogen input, the gas meter including an oxygen valving and a hydrogen valving; and an igniter tube and a first electrode and a second electrode angled relative to the igniter tube, the first electrode and the second electrode below the water level; wherein, when a pressure sensor positioned to be in fluid communication with the boiler vessel indicates that pressure within the boiler vessel is below an operational pressure, the gas meter intermittently provides a metered amount of a reactant gas to the igniter tube, the reactant gas including a mixture of the oxygen gas and the hydrogen gas; wherein, when the reactant gas displaces water surrounding the electrodes, the electrodes automatically arc and ignite the reactant gas due to an electrical resistance of the reactant gas; wherein, when the pressure sensor indicates that the pressure within the boiler vessel exceeds the operational pressure, the gas meter closes the oxygen valving and the hydrogen valving; wherein ignition of the metered amount of the reactant gas generates thermal energy to boil at least a portion of the water to produce steam.

In some aspects, the techniques described herein relate to a system where the first gas comprises oxygen.

In some aspects, the techniques described herein relate to a system where the first gas comprises oxygen and the second gas comprises hydrogen.

In some aspects, the techniques described herein relate to a system where the first gas comprises hydrogen.

In some aspects, the techniques described herein relate to a system where the first gas comprises hydrogen and the second gas comprises oxygen.

In some aspects, the techniques described herein relate to a system where the vapor output is configured to release excess vapor generated by the system if pressure within the system exceeds a predetermined safe pressure.

In some aspects, the techniques described herein relate to a system where the electrodes are configured such that they do not arc through the fluid due to resistance of the fluid.

In some aspects, the techniques described herein relate to a system where the electrodes are not deactivated when there is no reactant gas between the electrodes.

In some aspects, the techniques described herein relate to a system surrounded by insulation designed to reduce thermal energy radiated from the system.

In some aspects, the techniques described herein relate to a turbine configured to rotate from the vapor generated by a system according to the present disclosure.

In some aspects, the techniques described herein relate to a radiator configured to heat an area through use of vapor generated by a system according to the present disclosure.

In some aspects, the techniques described herein relate to a boiler configured to warm fluid before its boiling point through use of a system according to the present disclosure.

BRIEF DESCRIPTION OF THE DRAWINGS

These and other features, aspects and advantages of the present application are described with reference to drawings of certain embodiments, which are intended to illustrate, but not to limit, the present disclosure. It is to be understood that the attached drawings are for the purpose of illustrating concepts disclosed in the present application and may not be to scale.

DETAILED DESCRIPTION

Although certain embodiments and examples are described below in connection with conveying, screening and/or separating devices, systems and similar technologies, the disclosed embodiments and concepts are intended to extend and do extend beyond the specifically disclosed embodiments and/or uses and obvious modifications and equivalents thereof. The scope of the embodiments and concepts disclosed herein should not be limited by any particular embodiment(s).

Generally, one or more reactive gases can be provided at a measured input rate to a boiler system, where the gases are provided to a reaction zone where electrodes arc across the mixture formed by the gases. The mixture formed by the gases is released within a fluid and is ignited by electrodes, releasing thermal energy as well as some byproducts. The thermal energy rapidly heats the surrounding fluid, which can boil or otherwise and generate a vapor, such as steam. The produced vapor can exit the boiler system to power a turbine, to provide heat, or for any other purpose. A portion of the vapor can be recycled to power the system responsible for providing the one or more reactive gases at the measured input rate. In multiple embodiments disclosed herein, the boiler is described as a steam boiler designed to ignite a mixture of hydrogen and oxygen within water to generate steam, however various gases can be utilized where a reaction under a fluid can generate a vapor. For simplicity, the application will generally refer to a hydrogen-water reaction within water to generate steam, however this should be understood as only one possible interpretation of the system and is in no way meant to be limiting as to the possible reactions performed.

Figure 1:
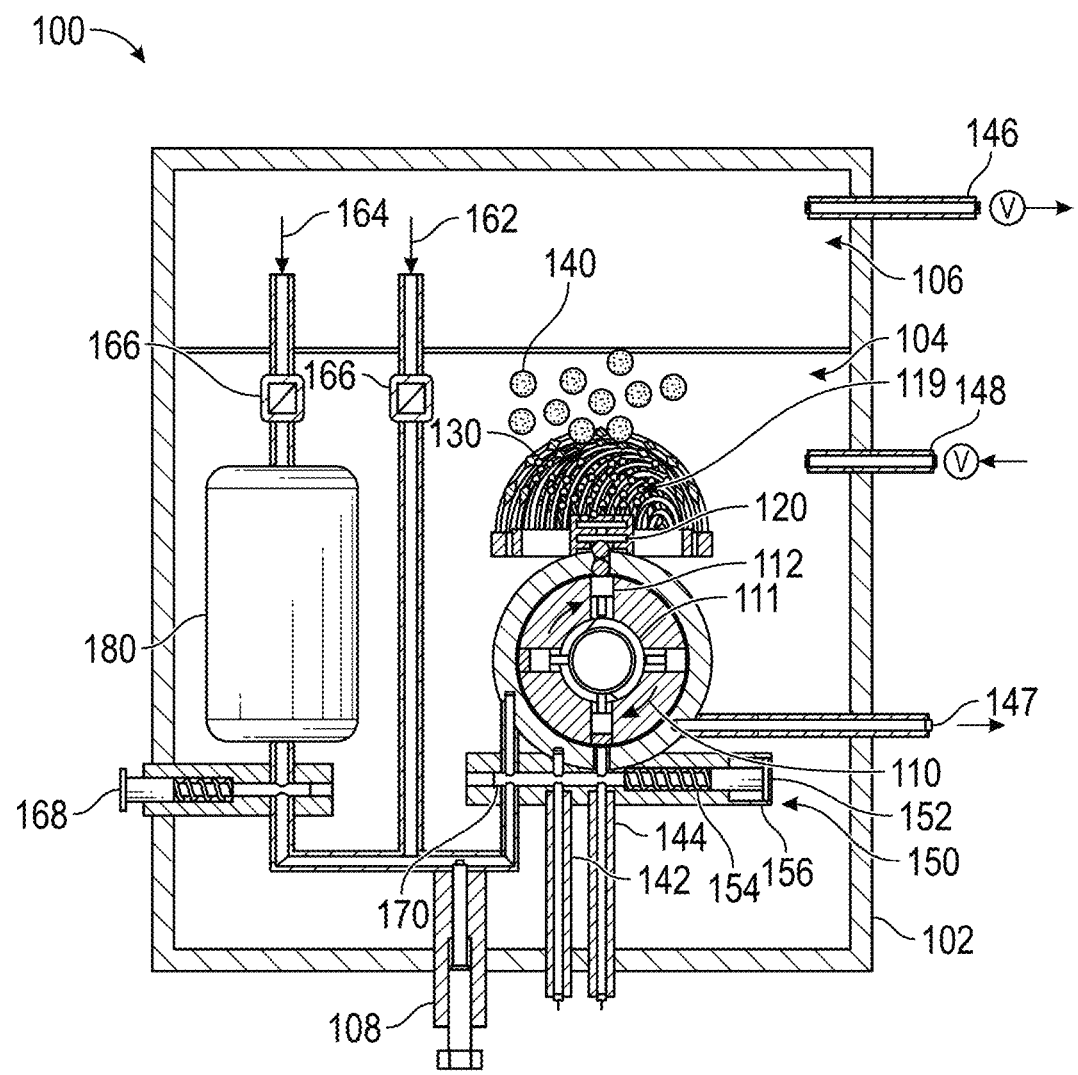
FIG. 1 depicts a front view of an embodiment of a steam boiler.

FIG. 1 depicts a front view of an embodiment of a steam boiler. In some embodiments, the steam boiler system can comprise a boiler vessel 102 configured to house a boiler system 100. The boiler vessel 102 can be configured to receive one or more conduits for fuel input and one or more outlet tubes 146 for the vapor to exit the system. In some embodiments, the boiler vessel 102 can be covered or substantially covered in insulation. Advantageously, the insulation can increase the efficiency of the system by reducing thermal energy lost by radiating out from the boiler vessel 102. Furthermore, the insulation can reduce the noise of the system during operation. Gas meters can intermittently provide metered amounts of one or more input gases to the boiler system 100. Various embodiments of gas meters are introduced through the application, including but not limited to a rotor 110, rotor 1010, or oxygen valving 2310 and hydrogen valving 2320, as described herein. Any and all gas meters can be in fluid communication with one or more input gases to provide them to the system.

In some embodiments, the pressure containment vessel 102 can have a bottom portion and a top portion. The bottom portion of the vessel can be filled with water or some other viable fluid up to a level 104 that covers a domed electrical grid 130. The top portion of the vessel can be filled with steam 106 (e.g., vapor) which is generated during operation of the boiler. During the operation of the boiler system, the liquid content of the boiler vessel 102 can lower over time. Therefore, in some embodiments the liquid content level can be maintained by a fill valve 148, which allows fluid to enter the containment vessel 102 as fluid is removed from the boiler vessel 102 as steam by the steam output 146 (e.g., vapor output). In some embodiments, the boiler system 100 can release excess steam generated by the boiler system 100 by the steam output 146 when pressure within the boiler system 100 exceeds a predetermined safe pressure. In some embodiments, the predetermined safe pressure of the boiler vessel 102 can be between 1.4 MPa and 6.7 megapascals (MPa).

In some embodiments, the reacting gas components can be introduced to the pressure containment vessel 102 to power the boiler system. In some embodiments, the gases to be fed into the boiler system can be a hydrogen gas and an oxygen gas. In some embodiments, hydrogen gas is introduced under pressure in a hydrogen input 144 and Oxygen gas is introduced via an oxygen input 142.

In some embodiments, the gas conduits can feed into a rotor 110 system which is configured to rotate. In the embodiment depicted in FIG. 1, the rotor 110 system rotates clockwise. In some embodiments, the rotor 110 can be rotated during standard operation of the system, through the use of a backup steam source, by a manual start, or by any other means. In some embodiments, the rotor 110 can be rotated by steam generated during the operation of the steam boiler by the rotor steam input 162. The steam powering the rotation of the rotor 110 can pass through the rotor steam input 162, through a check valve 166, through a volume control valve 108 and then to the rotor 110. At the rotor 110, the steam from the rotor steam input 162 can power rotation of an impeller or other method to translate the mechanical energy of the steam into a resultant rotational force to rotate the rotor 110. Upon driving rotation of the rotor 110, the steam from the rotor steam input 162 can exit the boiler vessel 102 by a waste steam outlet 147 (e.g., waste vapor outlet). In some embodiments, the waste steam exiting the boiler vessel 102 by the waste steam outlet 147 can be recycled and provided back into the system by the fill valve 148.

Figure 2:
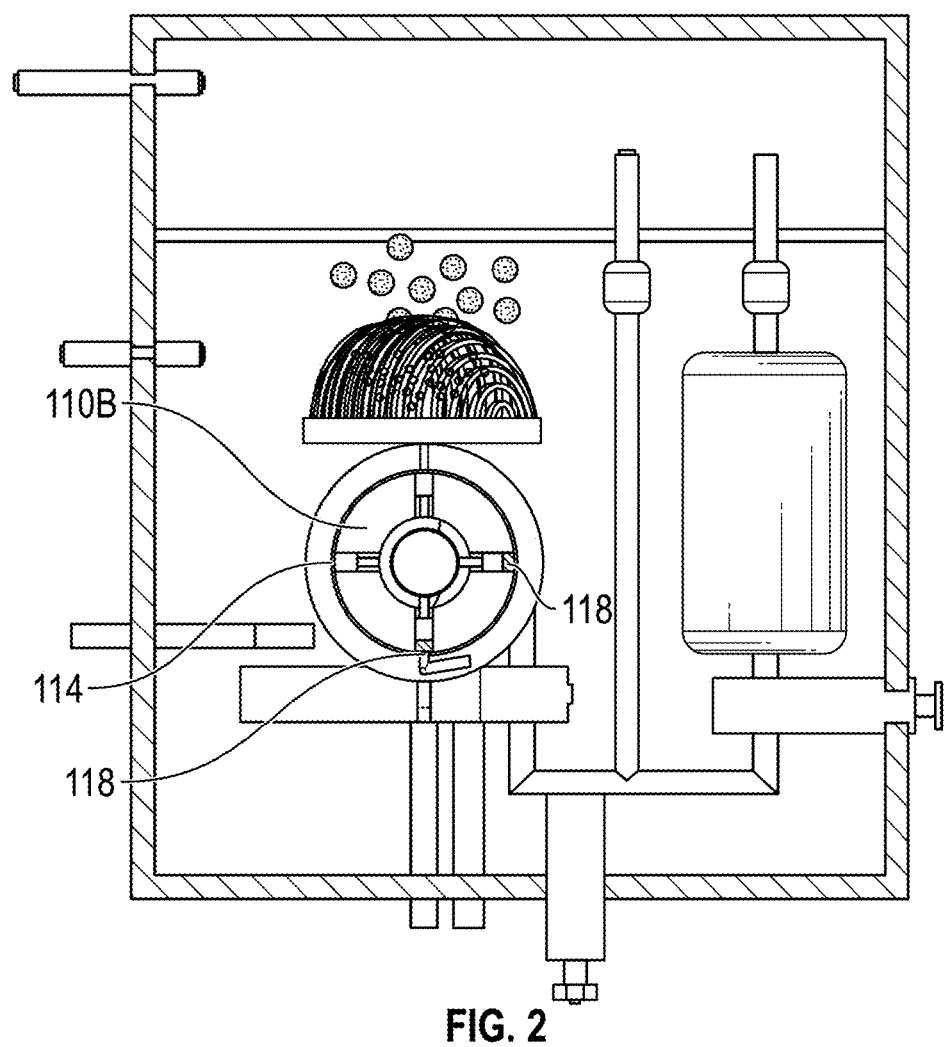
FIG. 2 depicts a back view of the steam boiler of FIG. 1.

FIG. 2 depicts the back side of the boiler depicted in FIG. 1. In the embodiment of the boiler system 100 depicted in FIGS. 1 and 2, the rotor 110 includes both a front portion 110A and a rear portion 110B. In one embodiment, the front portion 110A can provide hydrogen gas 116 by the hydrogen piston 112. In one embodiment, the rear portion 110B can provide oxygen gas 118 by the oxygen piston 114.

Figure 3:
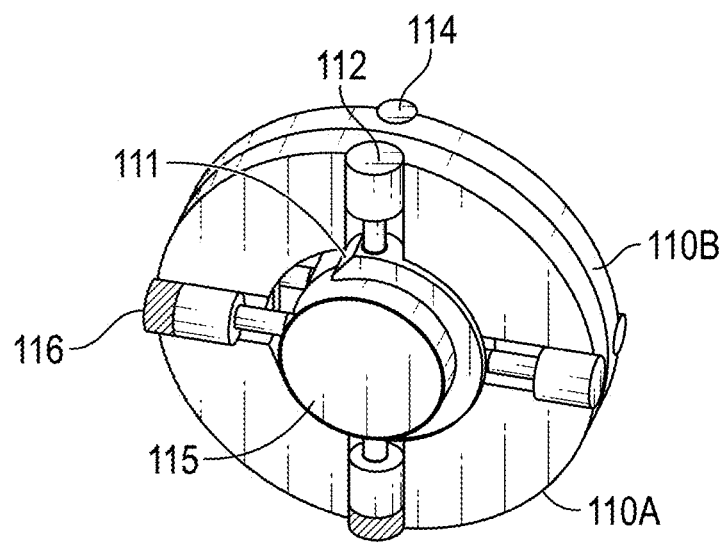
FIG. 3 depicts an isometric view of an embodiment of a piston rotor assembly used in an embodiment of a steam boiler.

FIG. 3 depicts an embodiment of the rotor system 110. In some embodiments, the rotor 110 acts as a gas meter to intermittently meter out specific amounts of the one or more gases that are provided to the system to react. In the examples used in FIGS. 1 through 3, the rotor 110 can form sealed areas between the walls of the piston shafts, the piston heads, and an outer housing of the piston to provide metered amounts of gas. In some embodiments, the rotor 110 can intermittently provide metered amounts of hydrogen gas 116 and oxygen gas 118 to be mixed to form the reactant gas. In some embodiments, a plurality of hydrogen pistons 112 and a plurality of oxygen pistons 114 are positioned along the circumference of the front portion 110A and rear portion 110B of the rotor, respectively.

The quantity and spacing of the pistons along the sides of the rotor 110 can vary as desired or required. A larger quantity of pistons could result in more frequent reactions, leading to more power generation. Conversely, a smaller quantity of pistons could result in less frequent reactions, leading to lower power generation. Rotational speed can also affect the quantity of gas provided, where a faster rotational speed can provide more of the mixed gas to the domed electrical grid 130, and a slower rotational speed can provide less of the mixed gas to the domed electrical grid 130.

In some embodiments, the diameter of the hydrogen piston 112 and the oxygen piston 114 may be different. In some embodiments, the hydrogen piston 112 may have a diameter that is approximately twice the diameter of the oxygen piston 114. This can assist in providing a mixture of gases that is more efficient to react in the reaction area of the boiler system 100. For example, an ideal reaction between Hydrogen gas and Oxygen gas would be approximately two parts $H_2$ to one part $O_2$. The resultant mixture gas can be ignited to produce thermal energy and water as reactants, resulting in the production of steam. In some embodiments, the relative diameters of the first set of pistons and the second set of pistons can vary as desired or required. In some embodiments, having three or more sets of pistons may be desirable to form a gas mixture for ignition within the boiler system 100 of three or more gases provided to the boiler system 100. In some embodiments, the thickness of the crown or head of the piston and/or the length of the connecting rod of the piston can change as desired or required to also affect the relative volumes of the first gas and the second gas in the rotor 110.

In some embodiments, the connecting rods of the hydrogen pistons 112 and oxygen pistons 114 can rest on a cam base 115 of the rotor 110. As the rotor 110 and thus the hydrogen pistons 112 and oxygen pistons 114 rotate around the center, the connecting rods can move from the cam base 115 to onto the cam rise 111 located around the cam base 115. Thus, as the rotor 110 rotates, the connecting rods of the hydrogen pistons 112 and the oxygen pistons 114 move from resting on the cam base 115 (e.g., the fall of the cam rise 111), to onto the cam rise 111, then back to the cam base 115 (cam fall) over the course of a complete rotation. This results in the hydrogen pistons 112 and oxygen pistons 114 intermittently providing metered amounts of the hydrogen gas 116 and oxygen gas 118 from the oxygen input 142 and the hydrogen input 144 to the reaction area. As the hydrogen pistons 112 and oxygen pistons 114 get close to the reaction area, the outer surface of the rotor 110 which was containing the gases has an opening to allow the gases to escape to the reaction area. At the bottom of the rotor, the gas pressure of the hydrogen and oxygen pushes the respective gases into the cavities left by the rising pistons to form a gas pocket. As the rotor continues to move clockwise the gas is trapped in the cylindrical area above the pistons. When the rotor rotates further, the hydrogen pistons 112 and oxygen pistons 114 reach the top end of the cam rise 111 and the pistons are raised expelling a precise amount of the hydrogen and oxygen located in the gas pockets out from the cam system. In some embodiments, there the gas can enter the reaction area. In some embodiments, before entering the reaction area, the hydrogen gas 116 and oxygen gas 118 can enter a mixer-dispersion nozzle 120.

Figure 4:
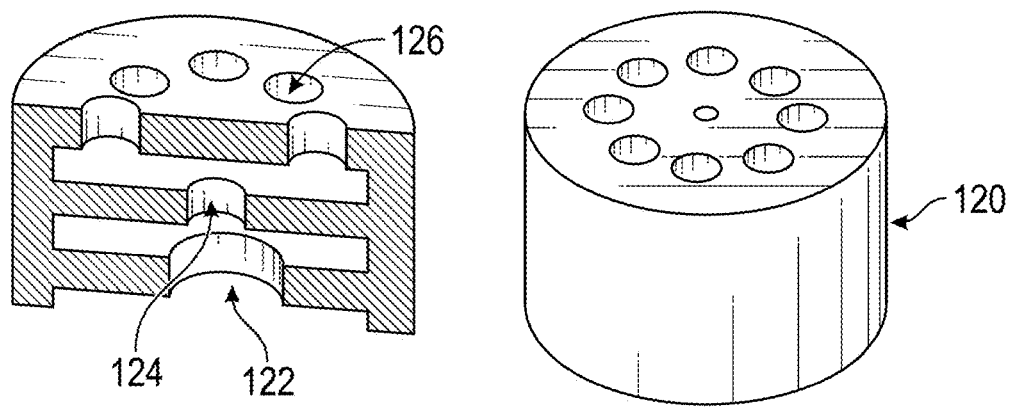
FIG. 4 depicts a mixer dispersion nozzle used in an embodiment of a steam boiler.

In some embodiments, as the gases exit the rotor 110 in a metered and defined ratio, the gases can enter a mixer-dispersion nozzle 120 configured to mix the plurality of gases to a more uniform gas mixture, with the intent of increasing the efficacy of the reaction. An example embodiment of a mixer dispersion nozzle is depicted in FIG. 4. Gases from the hydrogen pistons 112 and oxygen pistons 114 can enter the mixer dispersion nozzle 120 (e.g., mixing component, mixing system, etc.) by its input 122 located proximal the rotor 110. Within the mixer dispersion nozzle 120, the gases can be forced to mix by passing through one or more mixing orifices 124. These mixing apertures 124 can be configured to generate a turbulent flow that encourages mixing of the gases as they pass through the mixer dispersion nozzle 120. Once mixed, the gas can exit the mixer dispersion nozzle 120 by one or more exit apertures 126 on an end substantially opposite the input 122 of the mixer dispersion nozzle 120. In some embodiments, the mixer dispersion nozzle 120 can have one exit aperture 126. In some embodiments, the mixer dispersion nozzle 120 can have two or more exit apertures 126. In some embodiments, the mixer dispersion nozzle 120 can have multiple internal layers with mixing apertures 124. In some embodiments, the mixer dispersion nozzle 120 can have only one internal layer with mixing apertures 124. Alternatively, the gases from the rotor 110 can be mixed by any other mixing component as desired or required.

Figure 5:
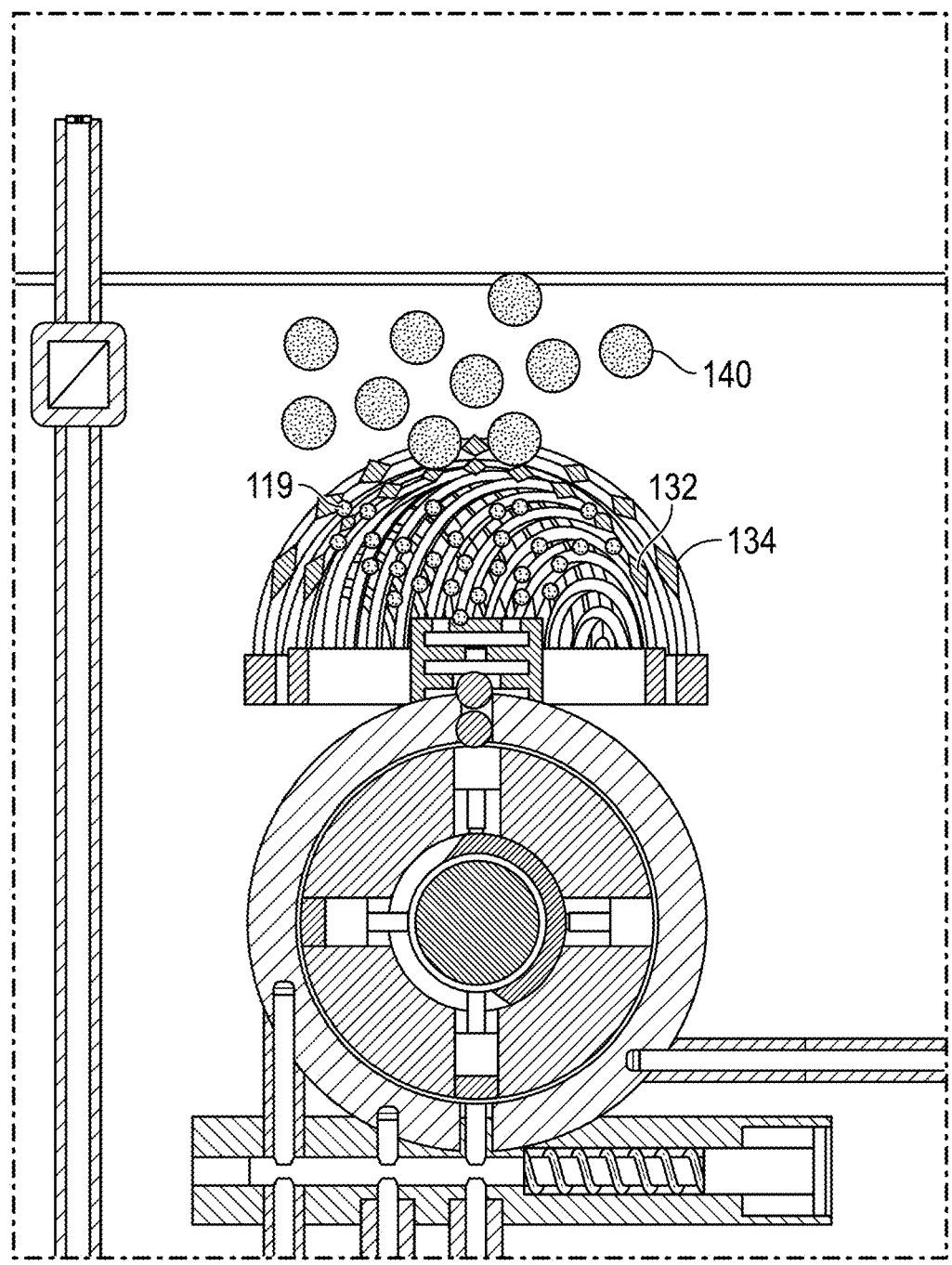
FIG. 5 depicts a cross-sectional view of a domed electrical grid used in an embodiment of a steam boiler.

In some embodiments, the mixed gas 119 that exits the exit aperture 126 can rise within the liquid within the pressure chamber 102. Upon leaving the mixer dispersion nozzle 120, after the mixed gas 119 passes a sufficient distance, it can cross through the first electrode 132 and the second electrode 134 of the domed electric grid 130. FIG. 5 depicts a cross-sectional view of the electric grid system. In some embodiments, the domed electrical grid 130 can comprise a first electrode 132 and a second electrode 134. The first electrode 132 and second electrode 134 can include a plurality of curved parallel bars, spaced apart and bent to form a generally domed shape. In some embodiments, the bars in second electrode 134 are set at a 90 degree rotation relative to the bars in the first electrode 132. In some embodiments, the top and bottom electric domes can have opposite direct current (DC) charges. In some embodiments, the bars of the first electrode 132 and the second electrode 134 can have a square, rhombus, or otherwise pointed cross section. In some embodiments, the bars of the first electrode 132 and second electrode 134 can have a pointed cross-sectional shape such that the corners of the bars face opposite each other. In such embodiments, these opposing corners present potential electrical arc points in a grid pattern. The mixed gas 119 exiting the mixer dispersion nozzle 120 can pass upwards and traverse the first electrode 132 and second electrode 134. In traversing the bars, the gas mixture has a lower electrical resistance than the surrounding water, so a spark can jump from first electrode 132, across the gas, to the second electrode 134, thus igniting the gas mixture. In some embodiments, the reaction of the mixed gas bubbles 119 at the domed electrical grid 130 can create steam, thermal energy, both steam and thermal energy, or result in releasing other energies. Advantageously, the surrounding water heated by the ignition can more efficiently be made into steam in subsequent reaction cycles. In some embodiments, the resultant steam 140 (e.g., the produced vapor) rises to the top portion of the boiler vessel 102 to enter the steam 106 portion. Excess pressure generated by the reaction can direct steam out from the boiler vessel 102 by the steam output 146. This excess steam can be used to generate power. The boiler system 100 can be configured to connect to a turbine or similar system to convert the steam to electrical energy.

In some embodiments, the boiler system can further include a pressure maintenance valve 150. The pressure maintenance valve 150 can include a piston 152, a spring 154 and a piston housing 156. The piston 152 has a shaft that can include a plurality of bores that align with at least one of the oxygen input 142 and hydrogen input 144 (e.g., gas inputs, material inputs) when in a second position to allow gases to pass through them. In some embodiments, the piston 152 can also include a bore that aligns with a rotor steam input 170 (e.g. rotor vapor input) to control whether steam can drive rotation of the rotor 110. When the boiler vessel 102 is in a high pressure state, the piston 152 can be in a first position and be misaligned with at least one of the oxygen input 142, hydrogen input 144, or rotor steam input 170, thus preventing or substantially preventing flow into the rotor 110.

When the boiler vessel 102 is in a lower pressure state, the piston 152 can be moved within the piston housing 156 to a second position (as shown in FIG. 1) and be aligned with at least one of the oxygen input 142, hydrogen input 144, or rotor steam input 170, thus allowing or substantially allowing flow into the rotor 110. When the pressure within the boiler vessel 102 is low, the piston 152 can be forced by the spring 154 to position the piston 152 to its second position. In the second position, the through holes then line up with bores of tubes and the boiler can be fed with the individual gases by the rotation of the rotor 110.

When pressure exceeds a predetermined value, the spring 154 can be configured to be compressed by piston 152 and the piston shaft moves forward to its first position, misaligning the three through holes in the piston 152 thus preventing or substantially preventing the flow of hydrogen and oxygen to the rotor. Advantageously, by utilizing this valving mechanism, the boiler system 100 can be self-regulating in that steam pressure is held within a usable range of pressure that can be used when needed at outlet tube 146.

In some embodiments, the speed of the rotor, and thus the volume of steam production, can be manually adjusted by valve 108 which can limit the amount of steam entering the rotor 110 by the rotor steam input 170. By limiting the steam to drive the rotor 110, then regardless of the internal pressure of the boiler vessel 102, the rotation speed of the rotor 110 can be slowed or stopped by the valve 108 limiting, substantially preventing, or preventing steam from entering the rotor steam input 170. Without steam to drive rotation of the rotor 110, the rotor 110 can come to a complete stop within the boiler system 100, and prevent further reactions within the boiler system 100 until the valve 108 is reopened to allow steam to power rotation of the rotor 110. In some embodiments, the valve 108 can limit the flow of steam to the rotor steam input 170. The valve 108 can be accessible from outside the boiler vessel 102 such that operation of the valve interrupts steam flow from either the primary rotor steam input 162 (e.g., primary rotor vapor input) and/or the auxiliary pressure tank 180 to the rotor 110. Preventing this steam from reaching the rotor 110 can prevent or substantially prevent rotation of the rotor 110.

In some embodiments, the boiler vessel 102 can further include an auxiliary pressure tank 180. The auxiliary pressure tank 180 can be positioned inline with an auxiliary steam input 164 (e.g., auxiliary vapor input) which can receive steam 106 (e.g., vapor) generated by the boiler system 100. The auxiliary pressure tank 180 can provide steam to drive the rotor 110 by the rotor steam input 170. The auxiliary pressure tank 180 can join with the primary rotor steam input 162 and/or the rotor steam input 170 that feeds to the rotor 110. In some embodiments, the auxiliary pressure tank 180 can provide steam to the rotor 110 when the amount of steam being generated by the system at a given time is insufficient to rotate the rotor 110. In some embodiments, the auxiliary steam input 164 can further include a check valve 166 to fill the auxiliary pressure tank 180 and prevent or substantially prevent gas from exiting the auxiliary pressure tank 180. In some embodiments, the auxiliary pressure tank 180 can include a push valve or trigger 168 which can allow the flow of steam stored by the auxiliary tank 180 as needed.

Similar to the pressure maintenance valve 150, the trigger 168 can include a spring to bias a piston of the trigger 168 in a first biased position. When biased into a first configuration by a spring, the trigger 168 can prevent or substantially prevent gas in the auxiliary pressure tank 180 to enter the rotor steam input 170 and power rotation of the rotor 110. If the boiler is stalled, pushing this trigger 168 that can extend beyond the boiler vessel 102 can convert it to a second configuration. In this second configuration, the trigger 168 can manually release pressure from the auxiliary tank 180 to provide steam to turn the rotor 110 and begin delivering the oxygen input 142 and hydrogen input 144 to the domed electrical grid 130 for reactions to form steam again. If the valve is pushed in into its second configuration, bores within the piston can allow gas to pass through the piston. The steam stored in the auxiliary pressure tank 180 can escape the auxiliary tank 180 by a bore through the shaft of the piston. In some embodiments, if the boiler is stalled, the piston 152 will be in its open configuration where gas is allowed to enter the rotor 110 from the oxygen input 142 and the hydrogen input 144; thus, if steam is provided by the auxiliary pressure tank 180, the rotor 110 can turn and intermittently provide a metered amount of gas to the combustion area by the domed electrical grid 130, producing steam.

In some embodiments, the devices and systems disclosed herein can generate steam at an output pressure and quantity suitable for their uses. For example, a boiler system can be configured to generate a constant source of steam exiting the boiler system between 200 and 1000 psi. The systems and devices disclosed herein can be scaled to generate the power requirement of its intended use. In some embodiments, boiler systems can include a plurality of sets of rotors and electrodes, such that the boiler vessel can generate more steam and/or more consistent steam.

As described herein, various modifications to a system can affect the volume of steam produced, including but not limited to: the size of the chambers formed in the rotor for the component gases, the number of cylinders on the rotor, the pressures of the input gases, the length of the stroke of the cylinders in the rotor, the number of rotor pairs in the system, the types of gases mixed and combusted, the temperature of the water in the system, and any other factors.

A mixture of gaseous hydrogen and oxygen is highly reactive, so in some embodiments of steam boilers according to the practices disclosed herein, the reactive input gases are individually delivered by hydrogen and oxygen pistons into a mixing and dispersion nozzle. Advantageously, providing the gases separately rather than as a mixed, highly reactive gas, increases the safety of the system by reducing potential violent reactions with large amounts of mixed gas. The gases are mixed in the nozzle and then dispersed into small bubbles of mixed gas. The mixed gas bubbles are dispersed just under the electric grid where they are ignited. By mixing the reactive gases just prior to ignition, the amount of mixed gas in the process is limited and damage to or destruction of the device is substantially reduced and/or prevented by the back ignition of the gases.

Figure 6:
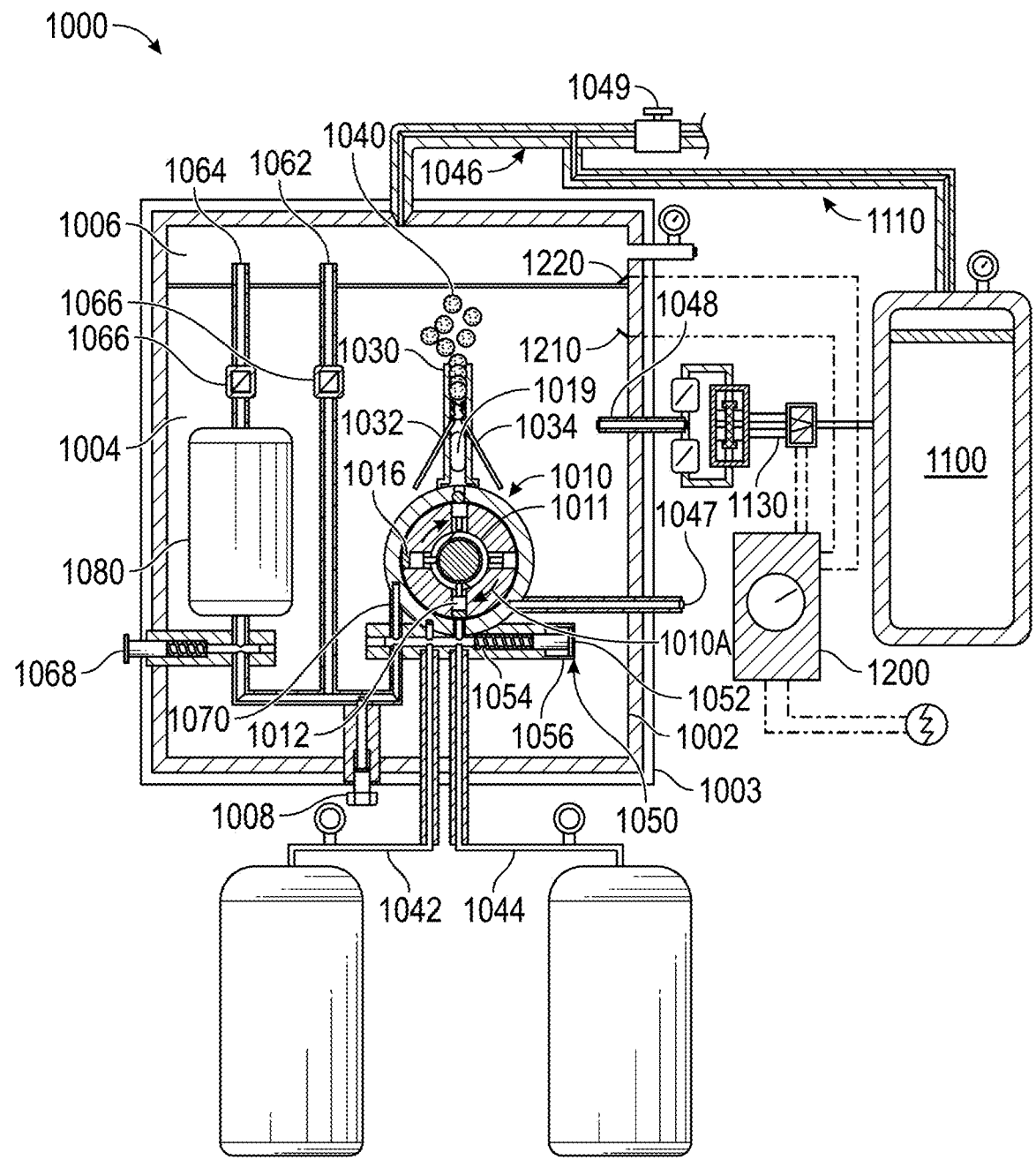
FIG. 6 depicts a front view of an embodiment of a steam boiler.
Figure 7:
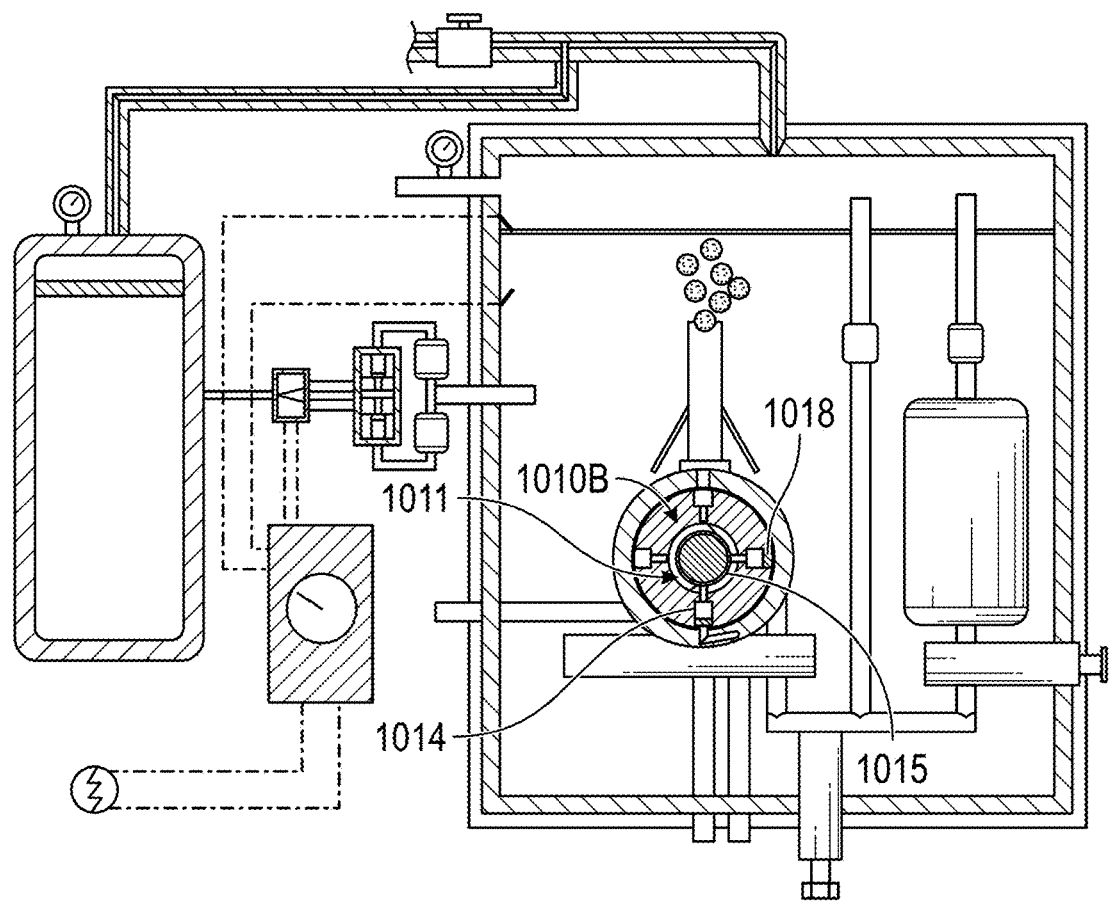
FIG. 7 depicts a back view of the steam boiler of FIG. 6.

FIGS. 6 and 7 depict an embodiment of a boiler system 1000 configured to generate steam. In some embodiments, the boiler system 1000 can be substantially similar to the boiler system 100 and other boiler systems as described herein, unless otherwise described. The boiler system 1000 can generate steam through the reaction of one or more gases that are mixed by a rotor 1010 and distributed into an igniter tube 1030 with electrodes 1032, 1034 configured to ignite the mixed gases and produce energy.

FIG. 6 depicts a boiler system 1000 configured to receive at least two different gases from tanks 1042, 1044 located outside a boiler vessel 1002. Metered amount of the gases of the tanks, which in this embodiment are oxygen and hydrogen, are fed into the boiler system 1000 to react and generate energy.

In some embodiments, the boiler vessel 1002 can be covered or substantially covered in insulation 1003. Advantageously, the insulation 1003 can increase the efficiency of the system by reducing the thermal energy that radiates out from the boiler vessel 1002. Furthermore, the insulation 1003 can reduce the noise of the system during operation.

The boiler vessel 1002 can contain both water 1004 (e.g., fluid) and steam 1006 (e.g., vapor), along with the systems required for power generation. As the system operates, the water level (e.g., fluid level) within the boiler vessel 1002 can fluctuate as water or the fluid is converted into steam or vapor. The system can include control means, such as a controller 1200, to maintain appropriate levels of water or fluid and steam or vapor in the system during use. In some embodiments, the appropriate levels could be sufficient to ensure that absent any mixed gas, the electrodes 1032, 1034 are fully submerged within the liquid. The controller 1200 can include a plurality of sensors to measure various characteristics of the boiler system 1000, including but not limited to a low limit switch 1210 and a high limit switch 1220.

The low limit switch 1210 can be positioned in the boiler vessel 1002 such that when the water or fluid 1004 in the boiler vessel 1002 is below a certain level, the low limit switch 1210 is at least partially exposed to steam or vapor 1006. When the low limit switch 1210 is at least partially exposed to steam 1006, it can send a signal to the controller 1200 that more water or fluid needs to be pumped into the boiler vessel 1002 by the fill valve 1048. This water can come from a water fill tank 1100, from a water conduit from outside the system, or from any other water source. Advantageously, providing chemically pure water (H$_2$O) to the boiler vessel 1002 can increase efficiency and reduce maintenance requirements of the boiler system 1000.

The high limit switch 1220 can be positioned in the boiler vessel 1002 such that when the water or fluid 1004 in the boiler vessel 1002 is above a certain level, the high limit switch 1220 is at least partially exposed to water or fluid 1004. When the high limit switch 1220 is at least partially exposed to water 1004, it can send a signal to the controller 1200 that no further water or fluid should be provided to the boiler vessel 1002. The controller 1200 can thus close off the fill valve 1048 and prevent further water from entering the system.

The controller 1200 can control operation of valving 1130 to provide fluid into the boiler vessel 1002. In some embodiments, the valving 1130 can include pumps or other systems to provide fluid to the boiler vessel 1002 even when the boiler vessel 1002 is under high pressure. In some embodiments, the valving 1130 can utilize control valve pressure boosters or other systems to provide fluid to a pressurized container. In some embodiments, a booster valve can allow for the slow filling of the boiler vessel 1002 with minimal electrical demands, increasing the efficiency of the boiler system 1000 overall. A booster valve can include a larger diameter piston pushed by the line pressure on the input side of the booster valve, where the larger diameter piston is in pressure communication with a smaller diameter piston that pushes a precise charge into the high-pressure output line. In some embodiments, the valving 1130 (e.g., valves) can increase the pressure of the water provided to the boiler vessel 1002 by the fill valve 1048 to be higher than the pressure in the boiler vessel 1002. In some embodiments, pressure provided from the boiler system 1000 by the pressure inlet 1110 and also assist with providing sufficient pressure to driving water into the boiler vessel 1002.

In some embodiments, the boiler system 1000 can receive fluid by the fill valve 1048 from a water fill tank 1100. The water fill tank 1100 can receive water in the form of condensing steam from the boiler vessel 1002 by the pressure inlet 1110, and/or any other water source. Advantageously, providing chemically pure water (H$_2$O) to the water fill tank 1100 can increase efficiency and reduce maintenance requirements of the boiler system 1000.

In some embodiments, the pressure containment vessel 1002 can have a bottom portion and a top portion. The bottom portion of the vessel can be filled with water or some other viable fluid up to a level that covers a tip of an igniter tube 1030. The top portion of the vessel can be filled with steam 1006 which is generated during operation of the boiler. During the operation of the boiler system, the liquid content of the boiler vessel 1002 can lower over time. Therefore, in some embodiments the liquid content level can be maintained by a fill valve 1048, which allows fluid to enter the containment vessel 1002 as fluid is removed from the boiler vessel 1002 as steam by the steam output 1046 (e.g., vapor output). In some embodiments, the boiler system 1000 can release excess steam generated by the boiler system 1000 by the steam output 1046 when pressure within the boiler system 1000 exceeds a predetermined safe pressure. In some embodiments, the predetermined safe pressure of the boiler vessel 1002 can be between 1.4 MPa and 6.7 megapascals (MPa). The boiler system 1000 can control steam or vapor leaving the system by an output valve 1049 arranged to limit the flow through the steam output 1046.

In some embodiments, the reacting gas components can be introduced to the pressure containment vessel 1002 to power the boiler system. In some embodiments, the gases to be fed into the boiler system can be a hydrogen gas and an oxygen gas. In some embodiments, hydrogen gas is introduced under pressure in a hydrogen input 1044 and Oxygen gas is introduced via an oxygen input 1042.

In some embodiments, the gas conduits can feed into a rotor 1010 system which is configured to rotate. In the embodiment depicted in FIG. 6, the rotor 1010 system rotates clockwise. In some embodiments, the rotor 1010 can be rotated as a during standard operation of the system, through the use of a backup steam source, by a manual start, or by any other means. In some embodiments, the rotor 1010 can be rotated by steam generated during the operation of the steam boiler by the rotor steam input 1062. The steam powering the rotation of the rotor 1010 can pass through the rotor steam input 1062, through a check valve 1066, through a volume control valve 1008 and then to the rotor 1010. At the rotor 1010, the steam from the rotor steam input 1062 can power rotation of an impeller or other method to translate the mechanical energy of the steam into a resultant rotational force to rotate the rotor 1010. Upon driving rotation of the rotor 1010, the steam from the rotor steam input 1062 can exit the boiler vessel 1002 by a waste steam outlet 1047 (e.g., waste vapor outlet). In some embodiments, the waste steam exiting the boiler vessel 1002 by the waste steam outlet 1047 can be recycled and provided back into the system by the fill valve 1048.

FIG. 7 depicts the backside of the boiler depicted in FIG. 6. In the embodiment of the boiler system 1000 depicted in FIGS. 6 and 7, the rotor 1010 includes both a front portion 1010A and a rear portion 1010B. The front portion 1010A can transmit one of the reactive gases to the reaction portion of the boiler system 1000. In one embodiment, the front portion 1010A can provide hydrogen gas 1016 by the hydrogen piston 1012. In one embodiment, the rear portion 1010B can provide oxygen gas 1018 by the oxygen piston 1014.

In some embodiments, the rotor 1010 is responsible for metering out specific amounts of the one or more gases that are provided to the system to react. In the examples used in FIGS. 6 and 7, the rotor 1010 can intermittently provide metered amounts of hydrogen gas 1016 and oxygen gas 1018 to be mixed to form the reactant gas. In some embodiments, a plurality of hydrogen pistons 1012 and a plurality of oxygen pistons 1014 are positioned along the circumference of the front portion 1010A and rear portion 1010B of the rotor, respectively.

The quantity and spacing of the pistons along the sides of the rotor 1010 can vary as desired or required. A larger quantity of pistons could result in more frequent reactions, leading to more power generation. Conversely, a smaller quantity of pistons could result in less frequent reactions, leading to lower power generation. Rotational speed can also affect the quantity of gas provided, where a faster rotational speed can provide more of the mixed gas to the igniter tube 1030, and a slower rotational speed can provide less of the mixed gas to the igniter tube 1030.

In some embodiments, the diameter of the hydrogen piston 1012 and the oxygen piston 1014 may be different. In some embodiments, the hydrogen piston 1012 may have a diameter that is approximately twice the diameter of the oxygen piston 1014. This can assist in providing a mixture of gases that is more efficient to react in the reaction area of the boiler system 1000. For example, an ideal reaction between Hydrogen gas and Oxygen gas would be approximately two parts $H_2$ to one part $O_2$. The resultant mixture of gas can be ignited to produce thermal energy and water as reactants, resulting in the production of steam. In some embodiments, the relative diameters of the first set of pistons and the second set of pistons can vary as desired or required. In some embodiments, having three or more sets of pistons may be desirable to form a gas mixture for ignition within the boiler system 1000 of three or more different gases provided to the boiler system 1000. In some embodiments, the thickness of the crown or head of the piston and/or the length of the connecting rod of the piston can change as desired or required to also affect the relative volumes of the first gas and the second gas in the rotor 1010.

In some embodiments, the connecting rods of the hydrogen pistons 1012 and oxygen pistons 1014 can rest on a cam base 1015 of the rotor 1010. As the rotor 1010 and thus the hydrogen pistons 1012 and oxygen pistons 1014 rotate around the center, the connecting rods can move from the cam base 1015 to onto the cam 1011 located around the cam base 1015. Thus, as the rotor 1010 rotates, the connecting rods of the hydrogen pistons 1012 and the oxygen pistons 1014 move from the cam base 1015 to the cam 1011, back to the cam base 1015. This results in the hydrogen pistons 1012 and oxygen pistons 1014 intermittently providing metered amounts of the hydrogen gas 1016 and oxygen gas 1018 from the oxygen input 1042 and the hydrogen input 1044 to the reaction area. As the hydrogen pistons 1012 and oxygen pistons 1014 get close to the reaction area, the outer surface of the rotor 1010 which was containing the gases has an opening to allow the gases to escape to the reaction area within the igniter tube 1030. At the bottom of the rotor, the gas pressure of the hydrogen and oxygen pushes the respective gases into the cavities left by the rising pistons to form a gas pocket. As the rotor continues to move clockwise the gas is trapped in the cylindrical area above the pistons. When the rotor rotates further, the hydrogen pistons 1012 and oxygen pistons 1014 reach the top end of the cam 1011 and the pistons are raised, expelling a precise amount of the hydrogen and oxygen located in the gas pockets out from the cam system. In some embodiments, there the gas can enter the reaction area within the igniter tube 1030.

In some embodiments, as the gases exit the rotor 1010 in a metered and defined ratio, the gases can enter a mixer-dispersion nozzle configured to mix the plurality of gases to a more uniform gas mixture, with the intent of increasing the efficacy of the reaction. Gases from the hydrogen pistons 1012 and oxygen pistons 1014 can enter a mixer dispersion nozzle which can be substantially similar in operation to the mixer dispersion nozzle 120 as described herein. Within the mixer dispersion nozzle, the gases can be forced to mix by passing through one or more mixing orifices. These mixing apertures can be configured to generate a turbulent flow that encourages mixing of the gases as they pass through the mixer dispersion nozzle. Once mixed, the gas can exit the mixer dispersion nozzle by one or more exit apertures on an end substantially opposite the input of the mixer dispersion nozzle. In some embodiments, the mixer dispersion nozzle can have one mixer dispersion nozzle. In some embodiments, the mixer dispersion nozzle can have two or more exit apertures. In some embodiments, the mixer dispersion nozzle can have multiple internal layers with mixing apertures. In some embodiments, the mixer dispersion nozzle can have only one internal layer with mixing apertures.

In some embodiments, the mixed gas 1019 that exits either the mixer dispersion nozzle or the rotor 1010 can rise within the liquid within the igniter tube 1030 to be reacted. The igniter tube 1030 can be of sufficient length to encourage mixing of the two or more input gases before reaction. In some embodiments, the igniter tube 1030 can have a length between approximately 200 mm and 300 mm between the exit of the rotor 1010 or mixer dispersion nozzle and the reaction zone to encourage mixing of the input gases. In some embodiments, the igniter tube 1030 can have a width between approximately 12 mm and 25 mm. In some embodiments, the mixed gas 1019 entering the igniter tube 1030 can be in the form of a singular bubble that extends up the length of the igniter tube 1030 until ignited by the electrodes 1032, 1034. In some embodiments, the mixed gas 1019 can be in the form of several bubbles. In some embodiments, the largest bubbles of the mixed gas 1019 can have a length of the distance between the end of the rotor 1010 and the electrodes 1032, 1034. In some embodiments, the smallest bubbles of the mixed gas 1019 produced can be at least 25 millimeters along the axis defined by the igniter tube 1030. In some embodiments of the system, the bubbles of the mixed gas 1019 must be of a sufficient length when within the igniter tube 1030 to dry the electrodes 1032, 1034 to spark and react the mixed gas 1019. In some embodiments, this minimum length can be 25 mm. In some embodiments, the mixed gas 1019 can displace all or substantially all the water within the igniter tube 1030 to sufficiently dry the electrodes 1032, 1034 for ignition. Once in the reaction zone, the mixed gas 1019 can pass between the electrodes 1032, 1034.

In some embodiments, the first electrode 1032 and the second electrode 1034 can have opposite direct current (DC) charges. In some embodiments, the electrodes 1032, 1034 can be charged with approximately 1000 megavolts (MV) of DC power at a low current. In some embodiments, the electrodes 1032, 1034 can operate at a low enough current such that they are non-reactive or substantially non-reactive with the water or other fluid within the boiler vessel 1002. In some embodiment, the mixed gas 1019 can have a resistance such that the first electrode 1032 can arc to the second electrode 1034 once the mixed gas 1019 passes between the electrodes 1032, 1034. Once the mixed gas 1019 passes between the electrodes 1032, 1034 and the electrodes arc, the mixed gas 1019 can ignite, generating steam, thermal energy, both steam and thermal energy, or result in releasing other energies. In some embodiments, the result of igniting the mixed gas 1019 can vary depending on the input gases, the contents of the boiler vessel 1002, and other factors.

In some embodiments, the electrodes 1032, 1034 can be angled relative to the interior surface of the igniter tube 1030. In some embodiments, the electrodes 1032, 1034 can be angled 45 degrees relative to the interior housing of the igniter tube 1030. In some embodiments, the electrodes 1032, 1034 can be angled relative to the igniter tube 1030 at an angle of less than 30 degrees, 30 degrees, 35 degrees, 40 degrees, 45 degrees, 50 degrees, 55 degrees, 60 degrees, more than 60 degrees, or any other intervening values, as desired or required by the use case. In some embodiments, the angle of the electrodes 1032, 1034 relative to the igniter tube 1030 can be based at least partially on the strength of the reaction caused by igniting the mixed gas 2019. In embodiments where the reaction is very violent, if the electrodes are at a greater angle they may bend towards the center of the ignition tube at the time of ignition. Similarly, if the electrodes are at a lesser angle they may bend towards the wall of the ignition tube at the time of ignition.

In some embodiments, the distance between the tips of the electrodes 1032, 1034 can be tuned for a specific bubble diameter of the mixed gas 1019 that is passing through the igniter tube 1030. For example, where the bubble diameter is 15 millimeters, the distance between the tips of the electrodes 1032, 1034 may be 4 millimeters. Having the electrodes 1032, 1034 angled relative to the interior surface of the igniter tube 1030 can prevent or substantially prevent the electrodes 1032, 1034 from arcing with the housing of the igniter tube 1030. In some embodiments, the interior surface of the igniter tube 1030 could be lined with a non-conductive material to prevent or substantially prevent of the electrodes 1032, 1034 with the interior surface of the igniter tube 1030, such as various polymers, Teflon, or urethane.

Advantageously, due to the configuration of the system, timing of the ignition of the mixed gas 1019 by the electrodes 1032, 1034 is automatically controlled due to the metered delivery of the oxygen input 1042 and hydrogen input 1044 by the rotor 1010. Once the mixed gas 1019 passes through the electrodes 1032, 1034, due to the resistance of the mixed gas 1019 relative to the water 1004, the electrodes 1032, 1034 do not need to be deactivated when there is no mixed gas 1019 between the electrodes 1032, 1034.

Advantageously, the surrounding water heated by the ignition can more efficiently be made into steam in subsequent reaction cycles. In some embodiments, the resultant steam 1040 (e.g. the produced vapor) rises to the top portion of the boiler vessel 1002 to enter the steam 1006 portion. Excess pressure generated by the reaction can direct steam out from the boiler vessel 1002 by the steam output 1046. This excess steam can be used to generate power.

In some embodiments, the boiler system can further include a pressure maintenance valve 1050. The pressure maintenance valve 1050 can include a piston 1052, a spring 1054 and a body 1056. The piston 1052 has a shaft that can include a plurality of bores that align with at least one of the oxygen input 1042 or hydrogen input 1044 when in a second position to allow gases to pass through them. In some embodiments, the piston 1052 can also include a bore that aligns with a rotor steam input 1070 to control whether steam can drive rotation of the rotor 1010. When the boiler vessel 1002 is in a high pressure state, the piston 1052 can be in a first position and be misaligned with at least one of the oxygen input 1042, hydrogen input 1044, or rotor steam input 1070, thus preventing or substantially preventing flow into the rotor 1010.

When the boiler vessel 1002 is in a lower pressure state, the piston 1052 can be moved within the body 1056 to a second position and be aligned with at least one of the oxygen input 1042, hydrogen input 1044, or rotor steam input 1070, thus allowing or substantially allowing flow into the rotor 1010. When the pressure within the boiler vessel 1002 is low, the piston 1052 can be forced by the spring 1054 to its second position. In the second position, the through holes then line up with bores of tubes and the boiler can be fed with the individual gases by the rotation of the rotor 1010.

When pressure exceeds a predetermined value, the spring 1054 can be configured to be compressed by piston 1052 and the piston shaft moves forward to its first position, misaligning the three through holes in the piston 1052 thus preventing or substantially preventing the flow of hydrogen and oxygen to the rotor. Advantageously, by utilizing this valving mechanism, the boiler system 1000 can be self-regulating in that steam pressure is held within a usable range of pressure that can be used when needed at outlet tube 1046.

In some embodiments, the speed of the rotor, and thus the volume of steam production, can be manually adjusted by valve 1008 which can limit the amount of steam entering the rotor 1010 by the rotor steam input 1070. By limiting the steam to drive the rotor 1010, then regardless of the internal pressure of the boiler vessel 1002, the rotation speed of the rotor 1010 can be limited by the valve 1008 limiting, substantially preventing, or preventing steam from entering the rotor steam input 1070.

In some embodiments, the boiler system 1000 can further comprise a valve 1008 configured to limit the flow of steam to the rotor steam input 1070. The valve 1008 can be accessible from outside the boiler vessel 1002 such that operation of the valve interrupts steam flow from either the primary rotor steam input 1062 and/or the auxiliary pressure tank 1080 to the rotor 1010. Preventing this steam from reaching the rotor 1010 can prevent or substantially prevent rotation of the rotor 1010.

In some embodiments, the boiler vessel 1002 can further include an auxiliary pressure tank 1080. The auxiliary pressure tank 1080 can be positioned inline with an auxiliary steam input 1064 which can receive steam 1006 generated by the boiler system 1000. The auxiliary pressure tank 1080 can provide steam to drive the rotor 1010 by the rotor steam input 1070. The auxiliary pressure tank 1080 can join with the primary rotor steam input 1062 and/or the rotor steam input 1070 that feeds to the rotor 1010. In some embodiments, the auxiliary pressure tank 1080 can provide steam to the rotor 1010 when the amount of steam being generated by the system at a given time is insufficient to rotate the rotor 1010. In some embodiments, the auxiliary steam input 1064 can further include a check valve 1066 to fill the auxiliary pressure tank 1080 and prevent or substantially prevent gas from exiting the auxiliary pressure tank 1080. In some embodiments, the auxiliary pressure tank 1080 can include a push valve or trigger 1068 which can allow the flow of steam stored by the auxiliary tank 1080 as needed.

Similar to the pressure maintenance valve 1050, the trigger 1068 can include a spring to bias a piston of the trigger 1068 in a first biased position. When biased into a first configuration by a spring, the push valve 1068 can prevent or substantially prevent gas in the auxiliary pressure tank 1080 to enter the rotor steam input 1070 and power rotation of the rotor 1010. If the boiler is stalled, pushing this trigger 1068 that can extend beyond the boiler vessel 1002 can convert it to a second configuration. In this second configuration, the trigger 1068 can manually release pressure from the auxiliary tank 1080 to provide steam to turn the rotor 1010 and begin delivering the oxygen input 1042 and hydrogen input 1044 to the igniter tube 1030 for reactions to form steam again. If the valve is pushed in into its second configuration, bores within the piston can allow gas to pass through the piston. The steam stored in the auxiliary pressure tank 1080 can escape the auxiliary tank 1080 by a bore through the shaft of the piston. In some embodiments, if the boiler is stalled, the piston 1052 will be in its open configuration where gas is allowed to enter the rotor 1010 from the oxygen input 1042 and the hydrogen input 1044; thus, if steam is provided by the auxiliary pressure tank 1080, the rotor 1010 can turn and provide a metered amount of gas to the combustion area by the igniter tube 1030, producing steam.

In some embodiments, the steam 1040 within the igniter tube 1030 can rise to join the steam 1006 and exit the steam output 1046. As the steam 1040 exits the igniter tube 1030, the steam 1040 can power an impeller or other turbine system. In some embodiments, this impeller system can provide energy to supplement the auxiliary pressure tank 1080 to power rotation of the rotor 1010.

Figure 8:
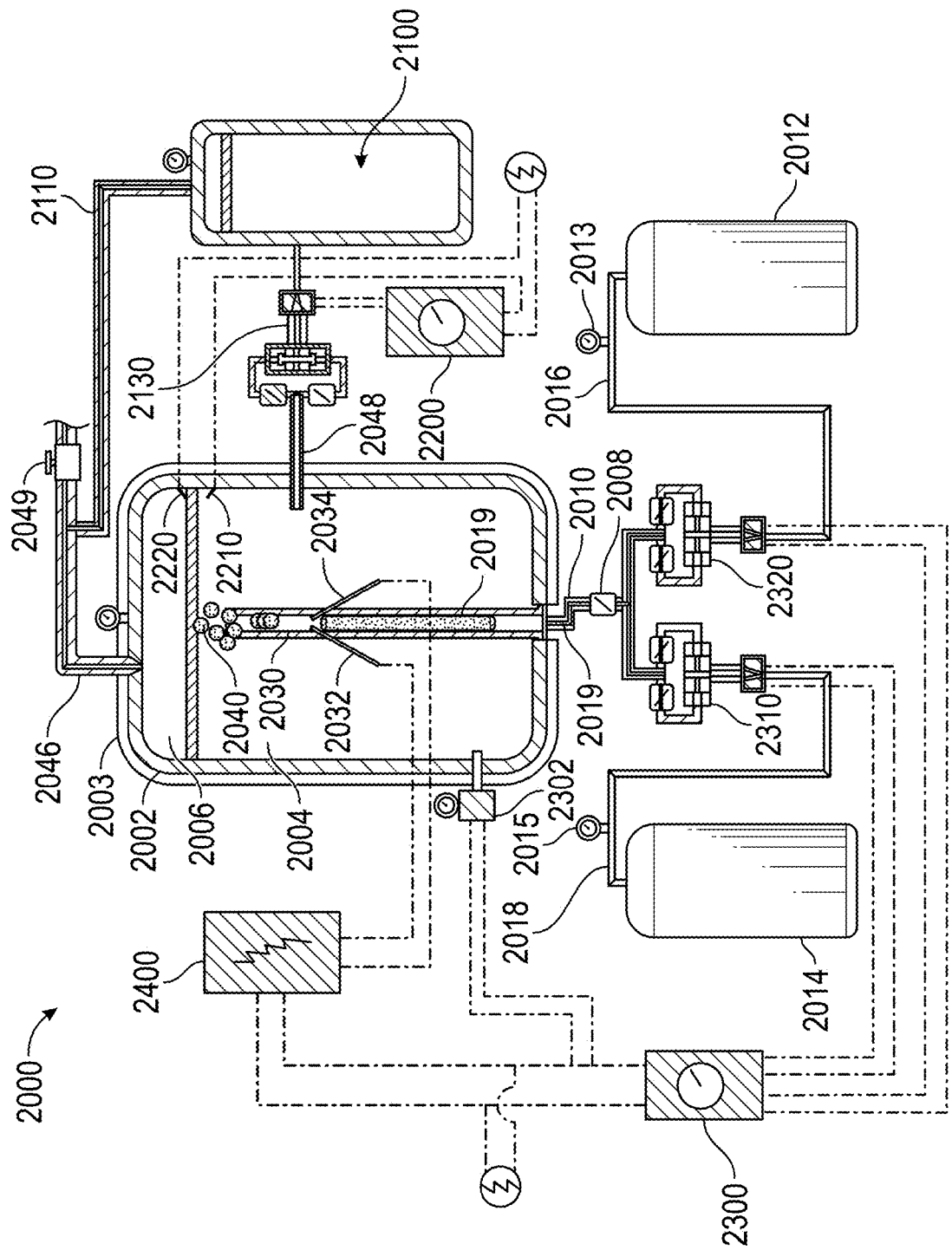
FIG. 8 depicts a front view of an embodiment of a steam boiler.

FIG. 8 depicts an embodiment of a boiler system 2000 configured to generate steam. In some embodiments, the boiler system 2000 can be substantially similar to the boiler system 1000, boiler system 100, and other boiler systems as described herein, unless otherwise described. The boiler system 2000 can generate steam through the reaction of one or more gases that are mixed in a mixing tube 2010 as it passes through an igniter tube 2030, where the mixed gas 2019 can ignite between electrodes 2032, 2034 to produce energy.

In some embodiments, the boiler vessel 2002 can be covered or substantially covered in insulation 2003. Advantageously, the insulation 2003 can increase the efficiency of the system by reducing the thermal energy that radiates out from the boiler vessel 2002. Furthermore, the insulation 2003 can reduce the noise of the system during operation.

The boiler vessel 2002 can contain both water 2004 and steam 2006, along with the systems required for power generation. As the system operates, the water level within the boiler vessel 2002 can fluctuate as water is converted into steam. The system can include control means, such as a water controller 2200 (e.g., fluid controller, fluid fill amount controller, controller, etc.), to maintain appropriate levels of water or fluid and steam or vapor in the system during use. In some embodiments, the appropriate levels could be sufficient to ensure that absent any mixed gas, the electrodes 2032, 2034 are fully submerged within the liquid. The water controller 2200 can include a plurality of sensors to measure various characteristics of the boiler system 2000, including but not limited to a low limit switch 2210 and a high limit switch 2220.

The low limit switch 2210 can be positioned in the boiler vessel 2002 such that when the water or fluid 2004 in the boiler vessel 2002 is below a certain level, the low limit switch 2210 is at least partially exposed to steam or vapor 2006. When the low limit switch 2210 is at least partially exposed to steam or vapor 2006, it can send a signal to the water controller 2200 that more water or fluid needs to be pumped into the boiler vessel 2002 by the fill valve 2048. This water or fluid can come from a water fill tank 2100 (e.g., fluid fill tank), from a water or fluid conduit from outside the system, or from any other water or fluid source. Advantageously, providing chemically pure water ($H_2O$) to the boiler vessel 2002 can increase efficiency and reduce maintenance requirements of the boiler system 2000.

The high limit switch 2220 can be positioned in the boiler vessel 2002 such that when the water or fluid 2004 in the boiler vessel 2002 is above a certain level, the high limit switch 2220 is at least partially exposed to water 2004. When the high limit switch 2220 is at least partially exposed to water or fluid 2004, it can send a signal to the controller 2200 that no further water or fluid should be provided to the boiler vessel 2002. The controller 2200 can thus close off the fill valve 2048 and prevent further water or fluid from entering the system.

The water controller 2200 can control operation of valving 2130 to provide fluid into the boiler vessel 2002. In some embodiments, the valving 2130 can include pumps or other systems to provide fluid to the boiler vessel 2002 even when the boiler vessel 2002 is under high pressure. In some embodiments, the valving 2130 can utilize control valve pressure boosters or other systems to provide fluid to a pressurized container. In some embodiments, a booster valve can allow for the slow filling of the boiler vessel 2002 with minimal electrical demands, increasing the efficiency of the boiler system 2000 overall. In some embodiments, the valving 2130 can increase the pressure of the water provided to the boiler vessel 2002 by the fill valve 2048 to be higher than the pressure in the boiler vessel 2002. In some embodiments, pressure provided from the boiler system 2000 by the pressure inlet 2110 and also assist with providing sufficient pressure to driving water into the boiler vessel 2002.

In some embodiments, the boiler system 2000 can receive fluid by the fill valve 2048 from a water fill tank 2100. The water fill tank 2100 can receive water in the form of condensing steam from the boiler vessel 2002 by the pressure inlet 2110, and/or any other water source. Advantageously, providing chemically pure water ($H_2O$) to the water fill tank 2100 can increase efficiency and reduce maintenance requirements of the boiler system 2000.

In some embodiments, the pressure containment vessel 2002 can have a bottom portion and a top portion. The bottom portion of the vessel can be filled with water or some other viable fluid up to a level that covers an upper end of an igniter tube 2030. The top portion of the vessel can be filled with steam 2006 which is generated during operation of the boiler. During the operation of the boiler system, the liquid content of the boiler vessel 2002 can lower over time. Therefore, in some embodiments the liquid content level can be maintained by a fill valve 2048, which allows fluid to enter the containment vessel 2002 as fluid is removed from the boiler vessel 2002 as steam by the steam output 2046.

In the embodiment depicted in FIG. 8, the input gases can be hydrogen gas 2016 and oxygen gas 2018, however the system can operate on the reaction of any two or more input gases than when mixed create a fuel source that can be ignited by a spark to produce energy.

In some embodiments, the boiler system 2000 can include a pressure switch 2302 (e.g., pressure sensor, sensor, switch, pressure detector, gauge pressure sensor, etc.). In some embodiments, as pressure within the boiler vessel 2002 drops below an operational pressure, the pressure switch 2302 can communicate to the gas controller 2300 that further reactant gas needs to be provided to the system, and open the oxygen valving 2310 and hydrogen valving 2320. When the boiler system 2000 meets or exceeds the operational pressure, the pressure switch 2302 can communicate to the gas controller 2300 that no further reactant gas needs to be provided to the system, and close the oxygen valving 2310 and hydrogen valving 2320. In some embodiments, the predetermined safe pressure of the boiler vessel 2002 can be between 1.4 MPa and 6.7 megapascals (MPa). In some embodiments, the gases can be input into the system between 0.5 and 2 MPa. The boiler system 1000 can control steam or vapor leaving the system by an output valve 2049 arranged to limit the flow through the steam output 2046.

In some embodiments, the gas controller 2300 can control oxygen valving 2310 and hydrogen valving 2320 configured to provide hydrogen gas 2016 and oxygen gas 2018 to the boiler vessel 2002.

In some embodiments, the oxygen valving 2310 can include pumps or other systems to provide gas to the boiler vessel 2002 even when the boiler vessel 2002 is under high pressure. In some embodiments, the oxygen valving 2310 can utilize control valve pressure boosters or other systems to provide gas to a pressurized container. In some embodiments, a booster valve can allow for the slow filling of the boiler vessel 2002 with minimal electrical demands, increasing the efficiency of the boiler system 2000 overall. In some embodiments, the oxygen valving 2310 can increase the pressure of the gas provided to the boiler vessel 2002 by the mixing tube 2010 to be higher than the pressure in the boiler vessel 2002.

In some embodiments, the hydrogen valving 2320 can include pumps or other systems to provide gas to the boiler vessel 2002 even when the boiler vessel 2002 is under high pressure. In some embodiments, the hydrogen valving 2320 can utilize control valve pressure boosters or other systems to provide gas to a pressurized container. In some embodiments, a booster valve can allow for the slow filling of the boiler vessel 2002 with minimal electrical demands, increasing the efficiency of the boiler system 2000 overall. A booster valve can include a larger diameter piston pushed by the line pressure on the input side of the booster valve, where the larger diameter piston is in pressure communication with a smaller diameter piston that pushes a precise charge into the high-pressure output line. In some embodiments, the hydrogen valving 2320 can increase the pressure of the gas provided to the boiler vessel 2002 by the mixing tube 2010 to be higher than the pressure in the boiler vessel 2002.

In some embodiments, the mixing tube 2010 can include a check valve 2008 to prevent or substantially prevent backflow of the gases into the oxygen valving 2310 or hydrogen valving 2320. Further check valves can be included in other portions of the boiler system 2000, such as in the steam output 2046, the pressure inlet 2110, or other components in the system.

In some embodiments, fuel for the boiler system 2000 can be stored in a hydrogen tank 2012 and an oxygen tank 2014. The oxygen in the oxygen tank 2014 can be released by an oxygen regulator valve 2015 such that the oxygen gas 2018 provided to the oxygen valving 2310 is provided at a constant pressure. The hydrogen in the hydrogen tank 2012 can be released by a hydrogen regulator valve 2013 such that the hydrogen gas 2016 provided to the hydrogen valving 2320 is provided at a constant pressure.

Metered amount of the input gases can be provided to the boiler system 2000 by the oxygen valving 2310 and hydrogen valving 2320. These gas meters can be controlled by various systems and methods as disclosed herein, including but not limited to a pressure switch 2302, to provide either a continuous flow of the input gases or an intermittent flow of charges of the input gases. In some embodiments, the pressure switch 2302 can control operation of the hydrogen regulator valve 2013 and oxygen regulator valve 2015 to prevent or substantially prevent new gas from entering the oxygen valving 2310 or hydrogen valving 2320 when the boiler vessel 2002 exceeds a critical pressure. In some embodiments, the pressure switch 2302 can control operation of the oxygen valving 2310 and hydrogen valving 2320 directly to prevent new gas from entering the boiler vessel 2002 when the boiler vessel 2002 exceeds the critical pressure. In some embodiments, the critical pressure of the boiler vessel 2002 can be 6.7 MPa.

In some embodiments, the volumes of the charges of oxygen gas 2018 and hydrogen gas 2016 provided by the oxygen valving 2310 and hydrogen valving 2320 (e.g., gas input valving) for the boiler vessel 2002 can be calculated based on one or more factors, including but not limited to the following: the desired reaction rate of the system, the temperature and/or pressure of the contents of the boiler vessel 2002, the water and/or steam content of the boiler vessel 2002, the volume of the input gases when subjected to the internal temperatures and pressures of the boiler vessel 2002, the dimensions of the igniter tube 2030 and the required sizes of the bubbles to sufficiently dry the electrodes 2032, 2034 to arc and ignite the mixed gases.

In embodiments that do not utilize a rotor to provide metered amounts of the input gases to the boiler system, all or substantially all of the steam generated by the boiler system can go toward power generation. In embodiments that utilize a rotor to provide metered amounts of the input gases to the boiler system, at least a portion of the steam generated by the boiler system may be needed to rotate the rotor. Advantageously, in systems that do not utilize a rotor, the system can advantageously not waste steam to power a rotor.

In some embodiments, the input gases can be mixed before entering the boiler vessel 2002. In some embodiments, the input gases can be mixed in a mixing tube 2010 before being provided to the igniter tube 2030 in the boiler vessel 2002. In some embodiments, the input gases can be mixed within the boiler vessel 2002 in the igniter tube 2030. In some embodiments, the input gases can be mixed within a mixer dispersion nozzle or other similar system.

In some embodiments, the mixed gas 2019 that enters the boiler vessel 2002 can rise within the liquid within the igniter tube 2030 to be reacted. The igniter tube 2030 can be of a sufficient length to encourage mixing of the two or more input gases before reaction. In some embodiments, the igniter tube 2030 can have a length between approximately 200 mm and 300 mm between the entrance on the boiler vessel 2002 and electrodes 2032, 2034 to encourage mixing of the input gases, and a width between approximately 12 mm and 25 mm. In some embodiments, the mixed gas 2019 entering the igniter tube 2030 can be in the form of a singular bubble that extends up the length of the igniter tube 2030 until ignited by the electrodes 2032, 2034. In some embodiments, the mixed gas 2019 can be in the form of several bubbles. In some embodiments, the largest bubbles of the mixed gas 2019 can have a length of the distance between the entrance to the igniter tube 2030 and the electrodes 2032, 2034. In some embodiments, the smallest bubbles of the mixed gas 2019 produced can be at least 25 millimeters along the axis defined by the igniter tube 2030. In some embodiments of the system, the bubbles of the mixed gas 2019 must be of a sufficient length when within the igniter tube 2030 to dry the electrodes 2032, 2034 to spark and react the mixed gas 2019. In some embodiments, the mixed gas 2019 can displace all or substantially all the water within the igniter tube 2030 to sufficiently dry the electrodes 2032, 2034 for ignition. In some embodiments, this minimum length can be 25 mm. Once in the reaction zone, the mixed gas 2019 can pass between the electrodes 2032, 2034.

In some embodiments, the first electrode 2032 and the second electrode 2034 can have opposite direct current (DC) charges. In some embodiments, the electrodes 2032, 2034 can be charged with approximately 900 kilovolts (kV) of DC power at a low current. In some embodiments, the electrodes 2032, 2034 can operate at a low enough current such that they are non-reactive or substantially non-reactive with the water or other fluid within the boiler vessel 2002. In some embodiments, the mixed gas 2019 can have an electrical resistance such that the first electrode 2032 can arc to the second electrode 2034 once the mixed gas 2019 passes between the electrodes 2032, 2034. Once the mixed gas 2019 passes between the electrodes 2032, 2034 and the electrodes arc, the mixed gas 2019 can ignite, generating steam, thermal energy, both steam and thermal energy, or result in releasing other energies. In some embodiments, the result of igniting the mixed gas 2019 can vary depending on the input gases, the contents of the boiler vessel 2002, and other factors.

In some embodiments, the electrodes 2032, 2034 can be angled relative to the interior surface of the igniter tube 2030. In some embodiments, the electrodes 2032, 2034 can be angled 45 degrees relative to the interior housing of the igniter tube 2030. In some embodiments, the electrodes 2032, 2034 can be angled relative to the igniter tube 2030 at an angle of less than 30 degrees, 30 degrees, 35 degrees, 40 degrees, 45 degrees, 50 degrees, 55 degrees, 60 degrees, more than 60 degrees, or any other intervening values, as desired or required by the use case. In some embodiments, the angle of the electrodes 1032, 1034 relative to the igniter tube 1030 can be based at least partially on the strength of the reaction caused by igniting the mixed gas 2019. In embodiments where the reaction is very violent, if the electrodes are at a greater angle they may bend towards the center of the ignition tube at the time of ignition. Similarly, if the electrodes are at a lesser angle they may bend towards the wall of the ignition tube at the time of ignition.

In some embodiments, the distance between the tips of the electrodes 2032, 2034 can be tuned for a specific bubble diameter of the mixed gas 2019 that is passing through the igniter tube 2030. For example, where the bubble diameter is 15 millimeters, the distance between the tips of the electrodes 2032, 2034 may be 4 millimeters. Having the electrodes 2032, 2034 angled relative to the interior surface of the igniter tube 2030 can prevent or substantially prevent the electrodes 2032, 2034 from arcing with the housing of the igniter tube 2030. In some embodiments, the interior surface of the igniter tube 2030 could be lined with a non-conductive material to prevent or substantially prevent arcing of the electrodes 2032, 2034 with the interior surface of the igniter tube 2030, such as various polymers, Teflon, or urethane.

Advantageously, due to the configuration of the system, timing of the ignition of the mixed gas 2019 by the electrodes 2032, 2034 is automatically controlled due to the metered delivery of the oxygen input 2014 and hydrogen input 2012 by the gas input valving, such as the oxygen valving 2310 and the hydrogen valving 2320. Once the mixed gas 2019 passes through the electrodes 2032, 2034, due to the resistance of the mixed gas 2019 relative to the water 2004, the electrodes 2032, 2034 do not need to be deactivated when there is no mixed gas 2019 between the electrodes 2032, 2034.

Advantageously, the surrounding water heated by the ignition can more efficiently be made into steam in subsequent reaction cycles. In some embodiments, the resultant steam 2040 (e.g., the produced vapor) rises to the top portion of the boiler vessel 2002 to enter the steam or vapor 2006 portion. The pressure generated by the reaction can direct steam or vapor out from the boiler vessel 2002 by the steam output 2046 (e.g., vapor output). This generated vapor can be used to generate power.

In some embodiments, the boiler system 2000 can further include an auxiliary pressure tank substantially similar to other auxiliary pressure tanks described herein. The auxiliary pressure tank can assist in regulating the pressure within the boiler vessel 2002 when first starting the system or otherwise. The auxiliary pressure tank can be filled and can provide pressurized gas to the boiler system 2000 in ways substantially similar to ways described herein for other auxiliary pressure tanks. The auxiliary pressure tank can optionally be located within the boiler vessel 2002. The auxiliary pressure tank can alternatively be located outside the boiler vessel 2002. If located outside the boiler vessel 2002, the auxiliary pressure tank can have its external surface covered with or substantially covered with insulation to limit the loss of thermal energy from the steam to the surroundings.

In some embodiments, the various electrical components of the boiler system 2000 can be powered by a transformer 2400 as required or desired. In some embodiments, the electrodes 2032, 2034 can require power provided by a transformer to reach their required operating parameters. In some embodiments, the gas controller 2300 can be configured such that, when the pressure reading from the pressure switch 2302 exceeds a maximum safe pressure, the gas controller 2300 disconnects the transformer 2400 to prevent any further reactions from within the chamber until the transformer 2400 is re-engaged. This can be performed instead of, or in addition to, sending signals to prevent flow of the input gases into the boiler vessel 2002 by controlling the oxygen valving 2310, and/or hydrogen valving 2320. In some embodiments, the input gases can be limited by operation of the hydrogen regulator valve 2013 and oxygen regulator valve 2015.

In some embodiments, any of the embodiments of boiler systems described herein can generate steam at certain operating rates. In some embodiments, the boiler system can regulate pressure within the boiler vessel by balancing the pressure generation rate with the pressure use rate. In some embodiments, the boiler system can generate at a sufficient rate to provide power and/or heat for a home or building.

In some embodiments, the boiler systems described herein can reach operational pressures within a maximum warm-up time. In some embodiments, the boiler system can pressurize from 1 atmosphere (ATM) (approximately 15 PSI, pound-force per square inch) within the boiler vessel to an operational pressure of 200 PSI in approximately 10 minutes.

Advantageously, in some embodiments the boiler system can be outfitted to heat water before the point of steam generation. In some embodiments, the boiler system can replace or supplement a standard boiler system. In some embodiments, steam generated by the boiler system can be routed to a radiator or other system to heat water to an operating temperature. In some embodiments, steam generated by the boiler system can be routed to a turbine or other system to power a rotor and generate electrical energy. In some embodiments, warmer water can be cycled into the boiler vessel and replaced with colder water, using devices and systems similar to the steam output and fill valve as described for other embodiments disclosed herein.

In some embodiments, the boiler systems as described herein can provide a gas mixture to the electrodes for reaction within the boiler vessel in a variety of bubble forms. In some embodiments, the mixed gas can be in the form of a singular bubble or substantially few bubbles. Having larger sized bubbles could increase the reaction rate and/or efficiency of the system. In some embodiments, the mixed gas can be in the form of a plurality of many smaller bubbles. Having smaller sized bubbles could increase the frequency of reactions within the boiler system and could decrease operational wear to the electrodes and/or the boiler vessel. Multiple factors could contribute to the size of the bubbles of the mixed gas within the boiler system, including but not limited to: the relative dimensions of the components in the boiler system, the diameter and/or quantity of any mixing apertures in a mixer dispersion nozzle, the length of the electrodes within the igniter tube, and the minimum length of the mixed gas to sufficiently dry the electrodes to allow them to arc and ignite the mixed gas.

In some embodiments, the system can have an operational pressure of 200 psi. In some embodiments, the bubbles of the mixed gas can be approximately elliptical in shape. In some embodiments, substantially all of the bubbles within the boiler vessel can be 15 mm wide and approximately 25 mm tall.

In some embodiments, the voltage differential between the electrodes required for an arc to form when a mixed gas passes between the electrodes can be related to the distance between the electrodes. In some embodiments, the voltage differential between the electrodes can be based on the following formula:

$$V = 24 + 4L$$

where L is the width between the electrodes. In some embodiments, a difference of 34,000 Volts between the first electrode and the second electrode may be required to form the required arcs to ignite the mixed gas as it passes through the electrodes. In some embodiments, a difference of 900 kilovolts between the first electrode and the second electrode may be required to form the required arcs to ignite the mixed gas as it passes between the electrodes.

In some embodiments, the amount of gas provided per metered amount for each reaction can vary through a variety of factors. In some embodiments, each metered amount of a mixed gas provided to the boiler system can comprise a mixture of Oxygen and Hydrogen. In some embodiments, for each metered amount of the mixed gas provided to the boiler system, the gas mixture comprises approximately 700 cubic centimeters ($cm^3$) of Oxygen and approximately 1400 cubic centimeters ($cm^3$) of Hydrogen.

In some embodiments, the gas provided to the boiler system can be provided at atmospheric pressure, and can compress to a smaller volume when the boiler system is at 200 psi. In some embodiments, 700 cubic centimeters ($cm^3$) of Oxygen provided at an input pressure of 1 atmosphere (approximately 15 psi) can be compressed to approximately 52 cubic millimeters ($mm^3$) within a boiler system and the 1400 cubic centimeters ($cm^3$) of Hydrogen provided at an input pressure of 1 atmosphere (approximately 15 psi) can be compressed to approximately 108 cubic centimeters ($cm^3$) within a boiler system.

In some embodiments, reaction of one mole of gaseous $H_2O$ as the mixed gas can generate approximately 68.2 kilocalories of energy. 1 mole of gaseous $H_2O$ is approximately 18 grams. In embodiments that utilize water within the boiler vessel, water boils at 182° C. at 200 psi. Under the assumption that the water within the boiler vessel is at 100° C., embodiments that provide 18 g of gaseous $H_2O$ as the mixed gas can generate 831 grams of liquid $H_2O$ at 100° C. to boil.

In some embodiments the boiler system can utilize a mixture of other gases for reaction rather than a mixture of oxygen and hydrogen. In embodiments that use gases other than oxygen and hydrogen reacting within water, the system can generate waste reactants and side reactions.

In some embodiments, the system can utilize a single gas, a mixture of two gases, or a mixture of three or more gases which, after reaction between the electrodes, releases thermal energy to boil at least a portion of the water or fluid within the system.

In some embodiments, the system can utilize a mixture of propane and oxygen which, after reaction between the electrodes, can generate carbon dioxide as a waste product which would need to be removed from the boiler system.

In some embodiments, the system can utilize a mixture of propane and air from the atmosphere which, after reaction between the electrodes, can generate carbon dioxide, nitrates, and other waste products which would need to be removed from the boiler system.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements, and/or states are in any way required for one or more embodiments or that one or more embodiments necessarily include these features, elements, and/or states.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

While the above detailed description may have shown, described, and pointed out novel features as applied to various embodiments, it may be understood that various omissions, substitutions, and/or changes in the form and details of any particular embodiment may be made without departing from the spirit of the disclosure. As may be recognized, certain embodiments may be embodied within a form that does not provide all of the features and benefits set forth herein, as some features may be used or practiced separately from others.

Additionally, features described in connection with one embodiment can be incorporated into another of the disclosed embodiments, even if not expressly discussed herein, and embodiments having the combination of features still fall within the scope of the disclosure. For example, features described above in connection with one embodiment can be used with a different embodiment described herein and the combination still falls within the scope of the disclosure.

It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this disclosure may comprise, additional to its essential features described herein, one or more features as described herein from each other embodiment disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Likewise, operations may be performed simultaneously or may occur in an at least partially overlapping fashion. Those skilled in the art will appreciate that in some embodiments, the actual steps taken in the processes illustrated and/or disclosed may differ from those shown in the figures. Depending on the embodiment, certain of the steps described above may be removed, others may be added.

Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

The invention may also be said broadly to consist in the parts, elements and features referred to or indicated in the description of the application, individually or collectively, in any or all combinations of two or more of said parts, elements or features.

It should be noted that various changes and modifications to the presently preferred embodiments described herein will be apparent to those skilled in the art. Such changes and modifications may be made without departing from the spirit and scope of the invention and without diminishing its attendant advantages. For instance, various components may be repositioned as desired. It is therefore intended that such changes and modifications be included within the scope of the invention. Moreover, not all of the features, aspects and advantages are necessarily required to practice the present invention. Accordingly, the scope of the present invention is intended to be defined only by the claims.

What is claimed is:

1. A system configured to generate vapor on reaction of one or more gases, the system comprising:
    a boiler vessel at least partially filled with water to a water level;
    a first gas input connected to the boiler vessel configured to provide a first gas to the system;
    a second gas input connected to the boiler vessel configured to provide a second gas to the system;
    a gas meter to receive the first gas and the second gas; and
    a reaction zone comprising an igniter tube and a pair of electrodes, the pair of electrodes positioned within the igniter tube below the water level;
    wherein the gas meter intermittently provides a metered amount of a reactant gas to the reaction zone within the boiler vessel, the reactant gas comprising a mixture of the first gas and the second gas;
    wherein the pair of electrodes are positioned within the igniter tube at a distance to encourage mixing of the reactant gas within the igniter tube;
    wherein the pair of electrodes are electrically charged such that, when the reactant gas passes between the pair of electrodes in the igniter tube, the pair of electrodes are sufficiently dried by the reactant gas to automatically arc to ignite the reactant gas; and
    wherein ignition of the metered amount of the reactant gas generates thermal energy to boil at least a portion of the water to form a produced vapor.

2. The system of claim 1, wherein the first gas comprises oxygen and the second gas comprises hydrogen.

3. The system of claim 1, wherein each of the pair of electrodes are angled at 45 degrees relative to the igniter tube.

4. The system of claim 1 further comprising a vapor output, wherein the produced vapor exits the boiler vessel by the vapor output.

5. The system of claim 4, wherein the vapor output is configured to release vapor from the system if pressure within the system exceeds a predetermined safe pressure.

6. The system of claim 1, wherein the gas meter comprises a first gas input valving and a second gas input valving controlled by a gas controller;
 wherein, when a pressure sensor positioned to be in fluid communication with the boiler vessel indicates that pressure within the boiler vessel is below operational pressure, the gas controller provides the first gas and the second gas to the reaction zone by the first gas input valving and the second gas input valving; and
 wherein, when the pressure sensor indicates that pressure within the boiler vessel exceeds operational pressure, the gas controller does not provide the first gas or the second gas to the reaction zone.

7. The system of claim 1, further comprising a controller, a low limit switch positioned at a first position in the boiler vessel, and a high limit switch positioned at a second position in the boiler vessel;
 wherein, when the low limit switch is at least partially exposed to vapor, the controller allows water to fill the boiler vessel; and
 wherein, when the high limit switch is at least partially exposed to water, the controller prevents water from further filling the boiler vessel.

8. The system of claim 1, wherein the vapor comprises steam.

9. The system of claim 1, further comprising a mixer dispersion nozzle configured to mix the first gas and the second gas of the metered amount of the reactant gas;
 wherein the mixer dispersion nozzle comprises a plurality of internal layers with one or more mixing apertures,
 wherein the metered amount of the first gas and the second gas mix as they pass through the one or more mixing apertures;
 wherein the reactant gas exits the mixer dispersion nozzle by an exit aperture to the reaction zone.

10. The system of claim 1, wherein the igniter tube is configured such that as the reactant gas advances through the igniter tube to the electrodes, the reactant gas forms into one or more larger bubbles of sufficient length to dry the pair of electrodes.

11. The system of claim 10, wherein the igniter tube is configured such that the one or more larger bubbles displace water within the igniter tube to sufficiently dry the pair of electrodes for ignition.

12. The system of claim 1, wherein an internal surface of the igniter tube is lined with a non-conductive material to prevent or substantially prevent the pair of electrodes from arcing with the igniter tube.

13. A system configured to produce steam on reaction of oxygen and hydrogen, the system comprising:
 a boiler vessel at least partially filled with water to a water level;
 an oxygen input comprising oxygen gas;
 a hydrogen input comprising hydrogen gas;
 a gas meter in fluid communication with the oxygen input and the hydrogen input, the gas meter comprising an oxygen valving and a hydrogen valving; and
 an igniter tube comprising a first electrode and a second electrode positioned within the igniter tube and angled relative to the igniter tube, the first electrode and the second electrode positioned below the water level;
 wherein the first electrode and the second electrode are positioned within the igniter tube at a distance to encourage mixing of oxygen gas and hydrogen gas within the igniter tube;
 wherein, when a pressure sensor positioned to be in fluid communication with the boiler vessel indicates that pressure within the boiler vessel is below an operational pressure, the gas meter intermittently provides a metered amount of a reactant gas to the igniter tube, the reactant gas comprising a mixture of the oxygen gas and the hydrogen gas;
 wherein, when the reactant gas displaces water surrounding the electrodes in the igniter tube and sufficiently dries the electrodes, the electrodes automatically arc and ignite the reactant gas;
 wherein, when the pressure sensor indicates that the pressure within the boiler vessel exceeds the operational pressure, the gas meter closes the oxygen valving and the hydrogen valving; and
 wherein ignition of the metered amount of the reactant gas generates thermal energy to boil at least a portion of the water to produce steam.

14. The system of claim 13, further comprising a mixer dispersion nozzle configured to mix the oxygen gas and the hydrogen gas of the metered amount of the reactant gas;
 wherein the mixer dispersion nozzle comprises a plurality of internal layers with one or more mixing apertures,
 wherein the metered amount of the oxygen gas and the hydrogen gas mix as they pass through the one or more mixing apertures;
 wherein the reactant gas exits the mixer dispersion nozzle by an exit aperture to the igniter tube.

15. The system of claim 13, wherein the igniter tube is configured such that as the reactant gas advances through the igniter tube to the electrodes, the reactant gas forms into one or more larger bubbles of sufficient length to dry the electrodes.

16. The system of claim 15, wherein the igniter tube is configured such that the one or more larger bubbles displace water within the igniter tube to sufficiently dry the electrodes for ignition.

17. The system of claim 13, wherein an internal surface of the igniter tube is lined with a non-conductive material to prevent or substantially prevent the electrodes from arcing with the igniter tube.

* * * * *